(12) United States Patent
Grigg

(10) Patent No.: US 8,829,704 B2
(45) Date of Patent: Sep. 9, 2014

(54) WIND TURBINE GENERATOR AND MOTOR

(71) Applicant: Charles Grigg, Westport, CA (US)

(72) Inventor: Charles Grigg, Westport, CA (US)

( * ) Notice: Subject to any disclaimer, the term of this patent is extended or adjusted under 35 U.S.C. 154(b) by 0 days.

(21) Appl. No.: 13/761,506

(22) Filed: Feb. 7, 2013

(65) Prior Publication Data

US 2013/0285382 A1 Oct. 31, 2013

Related U.S. Application Data

(63) Continuation of application No. 12/657,136, filed on Jan. 13, 2010, now Pat. No. 8,373,297.

(51) Int. Cl.
*F03B 13/00* (2006.01)
*H02P 9/04* (2006.01)
*F03D 9/00* (2006.01)

(52) U.S. Cl.
USPC .................................. 290/54; 290/44; 290/55

(58) Field of Classification Search
USPC .................. 290/44, 54, 55; 416/119
See application file for complete search history.

(56) References Cited

U.S. PATENT DOCUMENTS

| | | | | |
|---|---|---|---|---|
| 4,843 A * | 11/1846 | Rowand | ......................... | 415/3.1 |
| 113,284 A * | 4/1871 | Folsom | ......................... | 416/119 |
| 195,114 A * | 9/1877 | Folsom | ......................... | 415/66 |
| 247,266 A * | 9/1881 | Miller, Jr. | ...................... | 416/119 |
| 299,563 A * | 6/1884 | Martin | ........................ | 416/44 |
| 591,962 A * | 10/1897 | Evison | ........................ | 415/155 |
| 1,076,713 A * | 10/1913 | Southwick | .................... | 416/119 |
| 1,190,629 A * | 7/1916 | Clade | ........................... | 416/108 |
| 1,465,593 A * | 8/1923 | Barrett et al. | .................. | 416/14 |
| 1,524,712 A * | 2/1925 | Hurd | ............................. | 416/140 |
| 1,586,914 A * | 6/1926 | Palm | ............................. | 415/150 |
| 1,636,434 A * | 7/1927 | Pinaud | ........................ | 416/52 |
| 1,654,165 A * | 12/1927 | Felt | ............................... | 416/49 |
| 2,128,592 A * | 8/1938 | Mushkin | ...................... | 416/117 |
| 3,976,396 A * | 8/1976 | Antogini | ...................... | 416/119 |
| 4,048,947 A * | 9/1977 | Sicard | ........................... | 440/8 |
| 4,052,134 A * | 10/1977 | Rumsey | ........................ | 416/119 |
| 4,115,027 A * | 9/1978 | Thomas | ........................ | 415/53.1 |
| 4,203,707 A * | 5/1980 | Stepp | ............................ | 416/119 |
| 4,365,934 A * | 12/1982 | Mason | ........................... | 416/17 |
| 4,383,801 A * | 5/1983 | Pryor | ........................... | 416/17 |
| 4,424,451 A * | 1/1984 | Schmidt | ......................... | 290/54 |
| 4,494,007 A * | 1/1985 | Gaston | .......................... | 290/44 |
| 4,507,049 A * | 3/1985 | Strandgren | ..................... | 416/51 |
| 4,520,273 A * | 5/1985 | Rowe | ............................. | 290/54 |
| 4,534,703 A * | 8/1985 | Flavell | .......................... | 416/119 |
| 4,619,585 A * | 10/1986 | Storm | ........................ | 416/132 B |
| 4,679,985 A * | 7/1987 | Worms | ......................... | 416/119 |
| 4,725,194 A * | 2/1988 | Bartsch | ......................... | 415/4.2 |
| 4,776,762 A * | 10/1988 | Blowers, Sr. | .................. | 416/119 |
| 5,038,049 A * | 8/1991 | Kato | .............................. | 290/55 |
| 5,051,059 A * | 9/1991 | Rademacher | ..................... | 415/7 |

(Continued)

*Primary Examiner* — Pedro J Cuevas

(74) *Attorney, Agent, or Firm* — Howard Cohen

(57) ABSTRACT

A PAVA (parallel and vertical axis) turbine includes a plurality of wing assemblies having vertical pivot shafts extending between two vertically spaced end assemblies that are joined to a central driveshaft assembly. The wing assemblies are rotatable about their respective pivot axes from a drive position in which they extend radially outwardly from the central axis and transverse to incident fluid flow to maximally capture fluid flow and rotate the turbine, to a glide position in which the wings extend tangentially to the direction of rotation and parallel to incident fluid flow to minimize drag. The wings may have articulating flaps rotating outwardly from the wing assembly in the drive quadrant to capture more of the passing fluid flow.

14 Claims, 26 Drawing Sheets

(56) References Cited

U.S. PATENT DOCUMENTS

| | | | |
|---|---|---|---|
| 5,057,696 A * | 10/1991 | Thomas | 290/44 |
| 5,098,264 A * | 3/1992 | Lew | 418/23 |
| 5,126,584 A * | 6/1992 | Ouellet | 290/55 |
| 5,256,034 A * | 10/1993 | Sultzbaugh | 416/91 |
| 5,332,925 A * | 7/1994 | Thomas | 290/44 |
| 5,425,619 A * | 6/1995 | Aylor | 416/42 |
| 5,463,257 A * | 10/1995 | Yea | 290/55 |
| 5,676,524 A * | 10/1997 | Lukas | 416/17 |
| 6,006,518 A * | 12/1999 | Geary | 60/398 |
| 6,069,409 A * | 5/2000 | Fowler et al. | 290/55 |
| 6,242,818 B1 * | 6/2001 | Smedley | 290/44 |
| 6,734,576 B2 * | 5/2004 | Pacheco | 290/55 |
| 6,857,846 B2 * | 2/2005 | Miller | 415/4.2 |
| 7,083,382 B2 * | 8/2006 | Ursua | 416/110 |
| 7,323,791 B2 * | 1/2008 | Jonsson | 290/55 |
| 7,329,965 B2 * | 2/2008 | Roberts et al. | 290/55 |
| 7,385,302 B2 * | 6/2008 | Jonsson | 290/54 |
| 7,550,865 B2 * | 6/2009 | Jonsson | 290/55 |
| 7,591,635 B2 * | 9/2009 | Ryu et al. | 416/111 |
| 7,696,635 B2 * | 4/2010 | Boone | 290/55 |
| 7,780,411 B2 * | 8/2010 | Yan | 416/1 |
| 7,816,802 B2 * | 10/2010 | Green | 290/55 |
| 7,855,468 B2 * | 12/2010 | Lin | 290/54 |
| 7,880,322 B2 * | 2/2011 | Cumings et al. | 290/54 |
| 7,918,648 B1 * | 4/2011 | Simnacher | 416/111 |
| 7,942,624 B1 * | 5/2011 | Erb | 415/4.2 |
| 8,016,544 B1 * | 9/2011 | Nguyen | 415/60 |
| 8,120,196 B1 * | 2/2012 | Neese | 290/54 |
| 8,269,362 B2 * | 9/2012 | Cai | 290/44 |
| 8,419,367 B2 * | 4/2013 | Fite | 416/119 |
| 8,480,363 B2 * | 7/2013 | Fenaughty | 416/1 |
| 8,552,579 B2 * | 10/2013 | Richter et al. | 290/55 |
| 8,602,719 B2 * | 12/2013 | Kelly | 415/4.2 |
| 8,624,423 B2 * | 1/2014 | Ju | 290/55 |
| 8,657,575 B2 * | 2/2014 | Morris | 416/79 |
| 2002/0109358 A1 * | 8/2002 | Roberts | 290/54 |
| 2003/0122380 A1 * | 7/2003 | Harbison | 290/55 |
| 2006/0076782 A1 * | 4/2006 | Yeh et al. | 290/55 |
| 2006/0275105 A1 * | 12/2006 | Roberts et al. | 415/4.2 |
| 2008/0226449 A1 * | 9/2008 | Villella | 416/87 |
| 2008/0260532 A1 * | 10/2008 | Luethi | 416/51 |
| 2008/0309089 A1 * | 12/2008 | Lin | 290/54 |
| 2012/0045331 A1 * | 2/2012 | Villella | 416/5 |
| 2013/0136600 A1 * | 5/2013 | Tamatsu | 416/119 |
| 2013/0149147 A1 * | 6/2013 | Villella | 416/5 |
| 2013/0251524 A1 * | 9/2013 | Grigg | 416/9 |
| 2013/0285382 A1 * | 10/2013 | Grigg | 290/54 |
| 2014/0086749 A1 * | 3/2014 | Grigg | 416/98 |

* cited by examiner

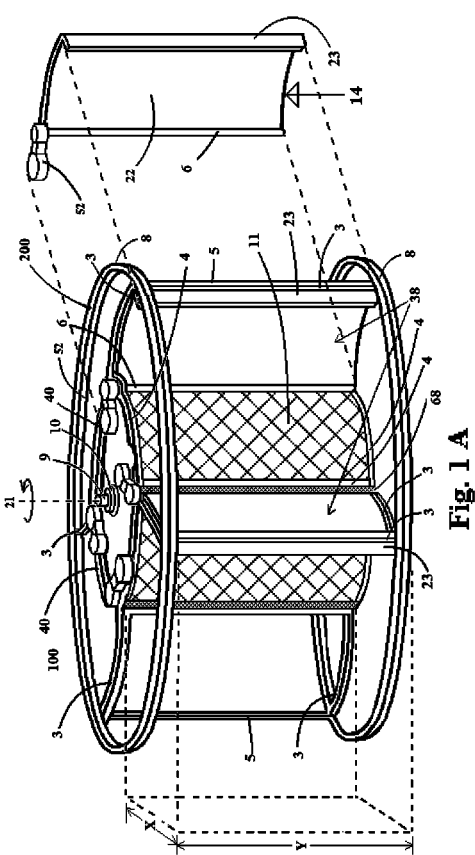

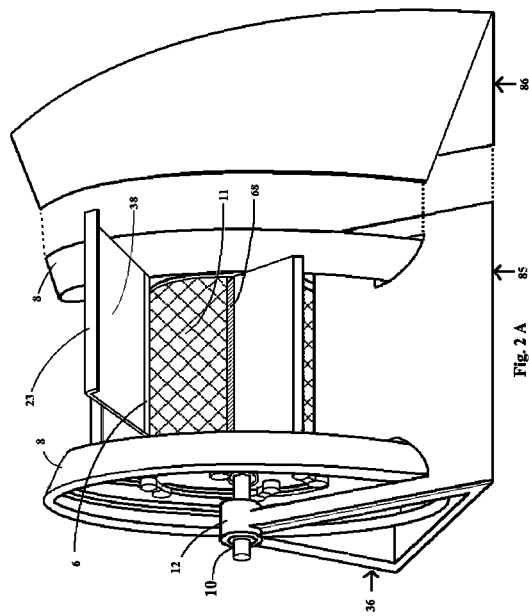

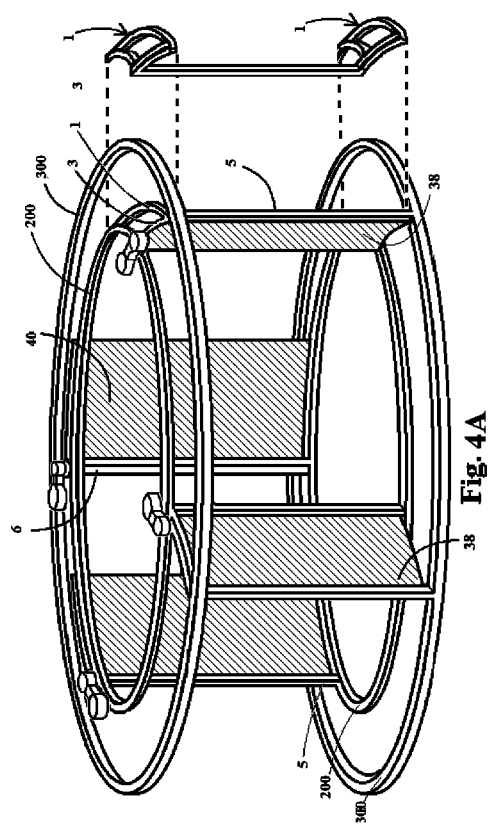

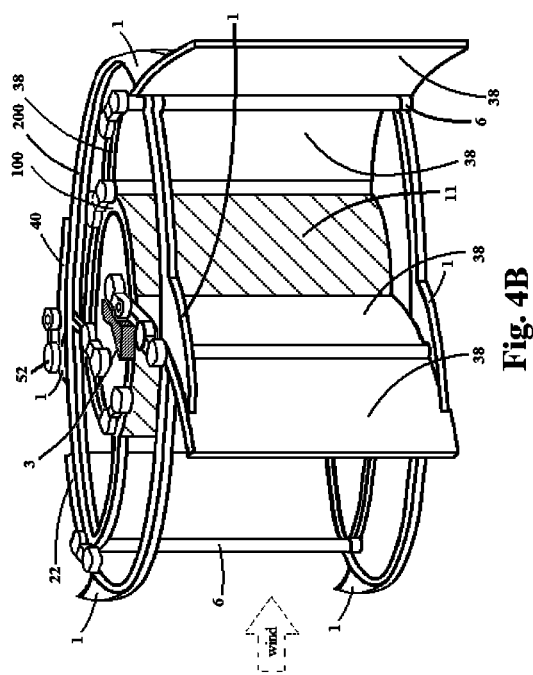

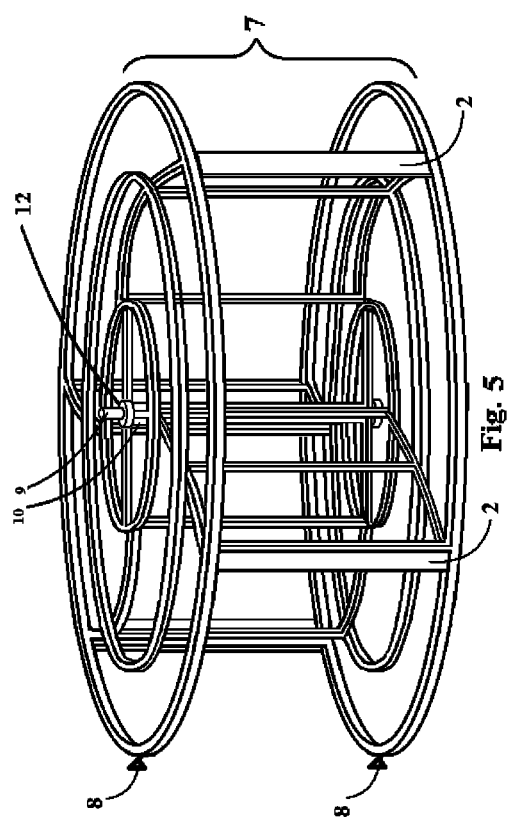

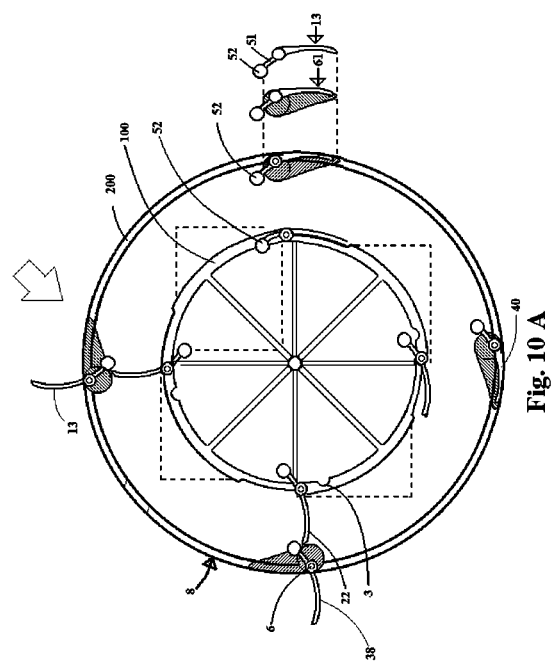

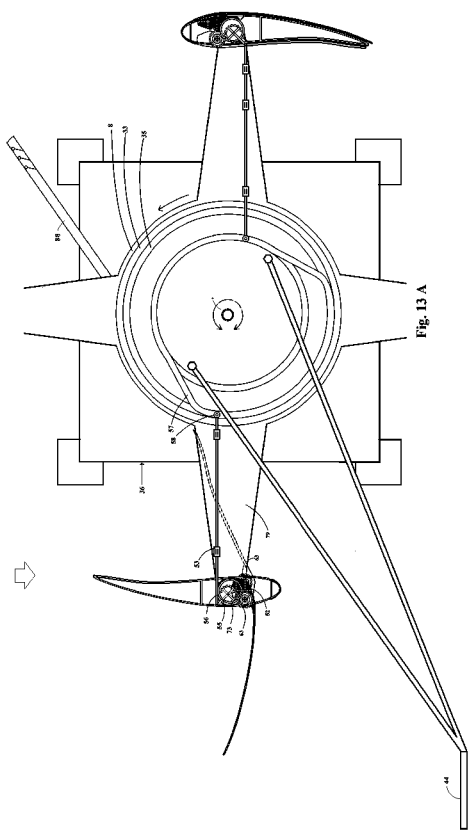

WIND TURBINE GENERATOR AND MOTOR

CROSS-REFERENCE TO RELATED APPLICATIONS

The application is a continuation-in-part of U.S. utility application No. 12/657,136, filed Jan. 13, 2010, now U.S. Pat. No. 8,373,297 issued Feb. 12, 2013.

FEDERALLY SPONSORED RESEARCH

Not applicable.

SEQUENCE LISTING, ETC ON CD

Not applicable.

BACKGROUND OF THE INVENTION

Although the invention is described above with reference to air flow and wind energy, it may be appreciated that any fluid flow will drive the turbine described herein. Thus there are ample opportunities to exploit water flow, such as river currents, tidal currents, wave action, and dammed water supplies.

The acronym PAVA stands for Parallel And Vertical Axis meaning that the pivot shaft and wing assemblies pivot axis is parallel to the rotating turbines assembly's central axis and drive shaft.

This continuation-in-part generally describes wind turbines that employ PAVA designs to maximize the frontal contact area in the drive side of the sweep area, reduce drag, increased wing loading and length of the glide cycle, resulting in a larger fraction of the energy of the incident fluid current harvested for useful work.

BRIEF SUMMARY OF THE INVENTION

PAVA turbines can be configured in stages. A single stage includes a plurality of wing assemblies, usually three or four, hinged and attached between the two end assemblies. In examples below, each stage optionally has corresponding concentric rings attached to each end assembly. A pair of end assembles, either disc and/or hub shaped with spokes that are referred to as hub arms, supporting the ends of the pivot shafts extending therebetween. Each consecutive stage is similarly configured, for example, the double stage models have an additional concentric ring added to the opposed end assemblies and are identical to the single stage aside from the greater circumference of the second concentrically arranged stage. Like the first stage the wings of each stage can be hinged to pivot either out from the corresponding concentric ring that is closest to the turbine's axis or optionally, inward towards said axis from the additional stage's outer concentric ring.

The various models of turbines include a central driveshaft assembly rotatable about an optional stationary axle and further including a rotating turbine assembly including an outer frame structure joined concentrically to the central drive shaft assembly, the outer frame structure comprised of but not limited to a pair of disc or hub shaped end assemblies extending parallel and spaced apart along said central axis with a plurality of pivot shafts secured between said end assemblies by bearing means with each pivot shaft having a respective pivot axis parallel to the central drive shaft.

The rotating turbine assembly further includes a plurality of wing assemblies secured to pivot shafts, said plurality of wing assemblies comprised of a single wing and pivot shaft assembly and/or a pair of opposed wings secured and pivoting on two adjacent pivot shafts or on a common compound hinged pivot shaft assembly sharing a common stationary axle. The wings are rotatable about their respective pivot axes from a wing drive position in which they extend generally radially and perpendicularly to incident fluid flow to maximally impinge on fluid flow, to a glide position in which wings extend generally tangentially to the rotational direction of the turbine and parallel to the incident fluid flow in a position of minimized drag. In addition, each wing and pivot shaft rotates approximately 70° to 110° within their end bearing and/or about their stationary axle.

Pivot Shafts

Each end of each pivot shaft in many models is secured in a bushing or bearing in the disc shaped end assembly, a hub shaped end assembly's spoke like arm and/or a concentric ring attached to the top and bottom end assembly of the rotatable turbine assembly, so that each wing is supported on its own pivot shaft extending parallel to the central drive shaft between the upper and lower end assembly. The pivot shaft may also rotate on a stationary axle connected to the opposed end assembly. The stationary axle in this capacity also serves as a strut, part of the rotating turbine's outer side support structure that extends coaxially about the central drive shaft. The outer support structure, includes the end assemblies the side support structure and the pivot axle that support the pivot shaft at both its ends.

Cylindrical Central Foil

The cylindrical central foil may extend concentrically about the central drive shaft and rotate with the turbine assembly or be stationary and support the turbine assembly as it rotates around it. Both models will be described below. The rotating and stationary central foils include a cylindrical drum shaped assembly that is concentrically placed around the central axis, between the central drive shaft and the operating space of the adjacent wing assemblies. The central foil functions to split and accelerate the incident fluid current entering into the central portion of the sweep area into a higher velocity glide and drive stream. As a result, the otherwise unharvested current passing through the area between the central drive shaft and wing's operating contact radius is concentrated, accelerated and directed into the drive wing significantly increasing the turbine wing loading, power and efficiency. The central foil can take up a significant portion of the turbine's sweep area as the distance between the central axis and the wing's inward operating perimeter is variable. The further out the wings operating space from the central axis the higher the torque leverage on the central drive shaft from the current impinging on the wings.

The central foil, instead of rotating, can also be stationary and joined to the central axle. In these models the combined stationary central foil and axle assembly serve as the rotating turbine's inter-stationary support and ground. With ring bearings surrounding the circumference of each stationary circular end of the foil, the central foil also functions in the capacity of the rotating turbine's stationary main axle, and the rotatable turbine end assemblies function as the two ends of the turbine's central drive shaft, rotating on ring bearings between it and the inter-stationary central foil and joined axle.

In a further modification of the stationary central foil, any portion thereof that contacts the fluid current going through the glide side of the sweep area can be removed leaving only the disc shaped end portion supporting the bearings and rotating turbine's end assembly along with that portion of the foil impinging on the accelerated currents directed into the wing's contact radius on the drive side of the sweep area.

A significant characteristic of the PAVA turbine design leaves a large fraction of the area in the glide quadrants between the retracted wing assembly, and the cylindrical central foil, vacant and free of the intrusion of any of the rotating turbines moving parts. This vacancy presents an opportunity for the placement of stationary object like an inter-stationary deflection panel attached to the stationary foil within the interior of the rotating turbine assembly. The deflection panel directs otherwise unused current into the drive quadrants to be harvested by the drive wings and transformed into useable energy. This significant embodiment will be explained in detail below.

Teardrop Shaped Wing Housings:

The articulating wings of some PAVA turbine designs have been consolidated into a traditional teardrop air foil. The teardrop shape has traditionally been associated with aircraft wings to create lift. These lift characteristic have also been incorporated in turbine designs in prior art having a plurality of teardrop shaped air foils capturing rotational torque that is transferred into captured energy.

By incorporating one articulating, or two opposed articulating wings within a housing with an airfoil profile PAVA turbines take advantage of these lift characteristics to increase forward rotation in the glide quadrants. Because the majority of turbine's energy is generated in the 90° drive quadrant, CFD modeling has shown that efficiency can be significantly increased by shortening the trans-drive and trans-glide potions of the rotation. In passive models the current regulates the four cycles of trans drive, drive, trans glide and glide naturally with each cycle lasting approximately 90° of rotation. Shortening the length of the non drive rotational cycles so each wing deploys rapidly in trans drive and retracts rapidly in trans -glide increases efficiency by lengthening the wing's glide cycle. This can be accomplished through mechanical methods, one method which is a cam system that actively regulates every increment of wing positioning and rotation as will be described in detail below.

PAVA models with rotating turbine assemblies without housing support structures like previous models can be made self trimming by extending an enlarged stationary axle out the bottom of the rotating assembly, supporting it by bearing means on a windmill mount having an extension arm and tail assembly that extends out the leeward direction acting as a weather vane to rotate the turbine on the windmill mount about the horizon keeping the intake opening of the turbine pointing directly into the direction of the oncoming current thereby taking advantage of incident wind from any bearing to harvest the maximum amount of power even in changing weather conditions. Likewise the grounding axle can be anchored by traditional means on a concrete piling, either way eliminating the need in many applications and expense of the outer housing structure described above.

Notes: 1) Because the PAVA design can be fabricated in multiple stages and because the stages are similar, the narrative and figures within this application only describe single and double stage models but are not intended to limit the PAVA wing placement designs from including any number of additional stages.

2) PAVA turbines evolved from two earlier embodiments from the above mentioned preceding patent applications of the turbine motors, specifically the cylindrical structure surrounding the main shaft that directs the fluid current into the drive side of the sweep area and the hinged wind fairing. Like some of the turbines from previous patent applications some of these turbine designs are naturally self trimming and some can be made self trimming with a conventional weathervane basically consisting of a grounded platform and a rotatable tail section as described above.

3) Modifications to the width of the hinged fairing has produced an enlarged and curved wing to match the circumference of the enclosed cylinder. First stage pivot shafts and wings can wrap around this centralized wind foil to a minimum drag position in glide and extend out in drive to a position of maximum drag presenting a surface approximately transverse to the incident wind to impinge on the current in drive.

Advantages

Advantages of these drag machines:

In many parts of the world the wind only blows seasonally. Because these turbines can be assembled and disassembled like a Farris wheel and transported on a truck these installations are re-locatable throughout the year to windier places. Unlike most HAWT (horizontal axis wind turbines) that are anchored in the ground these turbines do not have to remain idle when the wind stops blowing for extended periods. These vertical axis turbines are relatively slow turning high torque machines that can be substantially large of a design suited for transport in compact units, portable on a truck bed and easily re-locatable to places where the wind is blowing. Thus seasonal wind changes can be exploited without requiring placement of the wind turbine in a fixed location. Also being lower to the ground and having a small variety of parts, these machines are easy to maintain and relatively inexpensive to produce.

Tethering these machines to the ground is relatively easy. The turbine's grounding platform can be attached to a box made out of moveable panels that can be lined and pumped full of sand or water. The water can be stored, treated and reclaimed and also serve as a dampening device for the rotating turbine.

Environmental considerations: The large contact wing surface area of PAVA turbines make them relatively slow turning high torque. Consequently they are less hazardous to bird populations. In marine installations these turbines can be equipped with sensors that detects aquatic life that can activate mechanisms to reef the blades or raise the devise out of the water.

BRIEF DESCRIPTION OF THE DRAWING

FIG. 4 A is an perspective view of second stage with assembly 8 and drive stop 1 combinations replacing side structure 5.

FIG. 4B is a perspective view of the device of FIG. 4.

FIG. 5 is an illustration of frame structure 7 for stage one and two.

DETAILED DESCRIPTION

The PAVA embodiment in the series of design modifications relates to the placement of the wings relative to the central drive-shaft. Instead of the pivot shaft being held at the center of the turbine assembly in perpendicular relationship to the drive shaft as is characteristic of the original CAPA wing placement design from the parent patent application, the pivot shafta of this embodiment are moved out and attached to the side of the turbine assembly in parallel relationship to the central axis and central drive shaft creating the PAVA design, an acronym standing for Parallel And Vertical Axis.

There are several significant design characteristics of turbines with the PAVA wing placement design. PAVA Turbines having their wing's pivot shafts and central drive shaft in parallel relationship can be built in stages, and secondly turbines of this design have an open vacant area in the glide side of the sweep area where stationary objects that facilitate wing loading can be placed. These characteristics of the PAVA design have led to the ensuing embodiment from this research and are described in detail below.

First Stage PAVA

Figure 1:
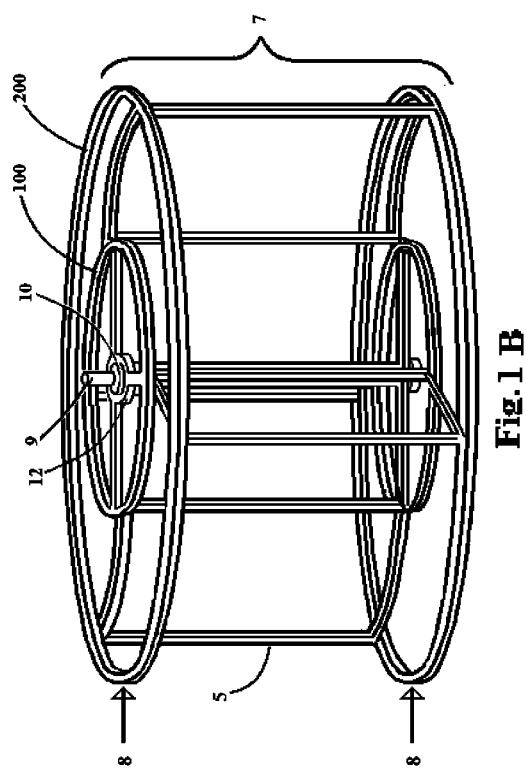
FIG. 1A is a perspective view of a single stage PAVA turbine assembly 43.
FIG. 1B is a perspective view of the frame 7 of the single stage PAVA turbine.

PAVA turbines can consist of more than one stage as will be described below. FIG. 1 however features a single stage PAVA turbine 43. A central component of this fluid current turbine is a central drive shaft 10 extending along axis 21 and adapted to rotate thereabout. The drive shaft assembly often comprises a hollow main shaft adaptable as an axle housing for a stationary main axle 9 to perform useful work, as will be described below.

A PAVA turbine 43 has a rotatable turbine frame structure 7. Turbine frame structure 7 typically is cylindrical in shape consisting of a cylindrical frame structure 7 that is joined concentrically to the central drive shaft 10. Cylindrical frame structure 7 includes a pair of opposed hub or disk shaped end assemblies 8 extending parallel and spaced apart along the turbine's central axis 21 creating a cylindrical operating space for a plurality of pivoting wing assemblies 13 joined to the central drive shaft's end assembly 8 at both its ends. End assembly 8 supports the pivot shaft 6 that support the wings, among other accessories. In the model shown in FIG. 1A the wings pivot out from the end assemblies on ring 100 at the perimeter of cylindrical ends of rotating wind foil 11. Also in this model the rotatable turbine frame structure 7 includes a plurality of side support struts 5 extending between the opposed outer rim of end assemblies 8 to reinforce the cylindrical rotating frame structure 7. In other models support strut 5 can be replaced with the pivot shaft's inter-stationary axle 15 that serves the dual purpose of strut 5 as a supporting member and also serves as the pivot axis for a pivoting wing assembly 13. Inter-stationary pivot shaft 15 often are supported between additional concentric ring/s that become incorporated in the structure of end assembly 8. Each additional ring on the multistage models seen later are numbered 100, 200, 300 etc.

The cylindrical turbine frame structure 7 is shown in FIG. 1B with the central stationary main axle 9, the central drive shaft 10, end assemblies 8, side strut structure 5, the central drive shaft bearing and bearing housing 12 and concentric rings 100 and 200. Between the drive shaft and the wing assemblies is the central foil 11 seen in FIG. 1A (the cross-hatched section at the center of the figure). Central foil 11 is a cylindrical drum shaped structure occupying the area between the central drive shaft 10 and the operating space of the pivoting wing assemblies 13. Central foil 11 directs otherwise escaping current going through the central portion of the sweep area into the drive wing to increase wing loading and turbine efficiency. The drive wings in this example have a turned up 90 degree wing tip 23 that fits into its wing's matching wing tip housing 68 in the central foil 11 when the wing is retracted in glide presenting a smooth cylindrical surface to the oncoming glide currents. Wing tip 23 inhibits current escape of the end of the wing, thereby increasing wing loading and efficiency.

Glide And Drive Stops

Glide stop 4 are a cushioned strip mounted on the turbine frame structure 7 where the perimeter of the wings meet frame structure 7 in their glide position 40. In this figure that happens to be at the upper and lower perimeter circumference and along the longitudinal side of the central foil 11 that serve the perimeter of each wing in its glide position as seen in FIG. 1A. The drive stops 3 are often located on the upper and lower end assemblies 8 and often on each side strut structure 5 and/or each structural member that matches the perimeter of the wing that contacts it in the wing's drive position 38. Note: The wings position are designated throughout this description as 38 drive, 39 trans-glide, 40 glide, and 41 trans-glide.

In some models the cylindrical support structure 7 can have its end assemblies 8 including the upper and lower wing stops 3 strengthened so that the side structure 5 can be removed to decrease drag obstruction in the wings glide cycle 40, as seen in FIG. 2A. Without the side strut structure the single stage turbine as seen in this figure can be equipped with an exterior and interior deflection structure 85 that is attached to the turbine's above ground support structure 36 that supports the main shaft 10 and joined rotating turbine assembly 43 on central drive shaft main bearing and bearing housing 12. The drive wings on this turbine are equipped with mini wings 23, as described above, to increase wing loading. The interior exterior deflection structure is so called because it extends from outside the rotating turbine frame structure 7 into the inside operating space in the vacant zone between the retracted wings in glide and the central foil. The turbine's end assembly 8 in this model are also funnel shaped at their intake orientation to increase wing loading. At the funneled shaped end assembly at the right is one of two optional extension attachment 86 seen in pulled out drafting fashion to the right of the FIG. 2A.

The pivot shafts 6 support the wings and are part of the pivoting shaft assembly 14 that is part of the wing assembly 13. Wing assemblies 13 extend parallel to the main shaft and axis 21. Wing assembly 13 includes the pivot shaft assembly 14 and is presented in detail in FIG. 6. The wing assembly 13 is secured at each end of its wing's pivot shaft, to the ends corresponding to the upper or lower turbine end assembly 8. Each pivot shaft 6 is attached and secured to one edge of a flat or curved wing by conventional means know in mechanical art. As seen in FIG. 1A each wing 22 of this first stage turbine has a curved wing desirably strong, durable, and lightweight. The outer side of the curvature of the wing in this example of the first stage turbine matches the curvature of the drive stops 3 that extends from the central foil 11 to the outer strut 5 on the cylindrical turbine strut structure 7.

The inner curvature of the wing matches the curvature of the upper and lower portions of the cylindrical central foil 11 to which each of the corresponding glide stops are attached as also seen in the top view FIG. 2C. When the wing comes to its glide stop located on the perimeter of the central foil 11 the wing's exterior profile becomes integrated into a matching recess built into the outer surface of the foil, so that when the wing assembly is retracted in glide the foil cushioned surface adjacent to the retracted wing becomes the wing's glide stop 4 and the foil's outer surface assumes its smooth exterior cylindrical profile. FIG. 2C top view shows this clearly with the wing in glide 40 identified in its glide position and integrated into the curvature of central foil 11 at the bottom right of the FIG. This top view also show how the counter weight 52 and weight arm 51 of the wing fit the manufactured inner profile provide in the inner rim of central foil or concentric ring to which the wing's pivot shaft 6 is attached that also can be cushioned and serve as the wing's glide stop.

Figure 2B:
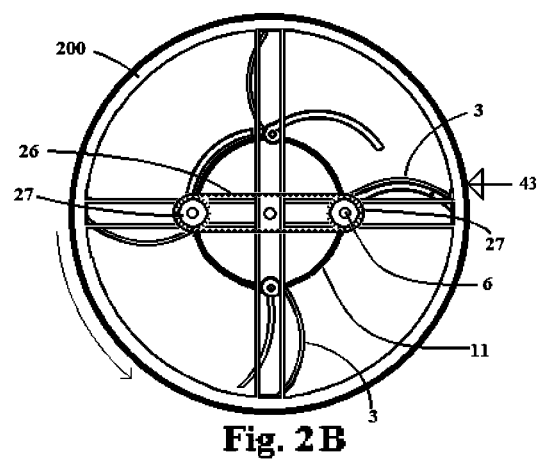
FIG. 2B is a top view of a single stage PAVA with gears and flat belt connecting one wing with a second wing on the opposite side of the sweep area.

Although the glide and drive cycles can be naturally regulated by the current, when greater control is desirable and/or when gravity is an issue, it is possible to gear two wings together to work in tandem so as each wing transitions down it is counter balanced with its connected corresponding wing transitioning up etc. FIG. 2B, is but one possible mechanical example of this arrangement. Gears 27 are attached to the ends of each pivot shaft 6 just above the end assembly 8. By connecting a flat belt 26 to both gears 27 at the end of each pivot shaft, one pivot shaft and wing can be connected to the pivot shaft and wing on the opposite side of the sweep area. Thus as one wing deploys into drive it is connected to its corresponding wing on the opposite side of the sweep area retracting into glide and vice versa. One or two of these paired connections may be made on one end assembly 8, serving all wings in the first stage, or another connection like the two wing examples could be made on the opposite end assembly serving the other pair of wings. This is but one method of attaching two wings together. Other methods known in mechanical art, such as the use of levers, gears, cam systems etc. could alternatively be used, some examples of which will be detailed below.

The pivoting wing assembly 13 rotates about the axis of the central drive shaft 10, attached out on the end assembly 8 in parallel relationship to the central drive shaft and pivot approx. 90° perpendicular to the central drive shaft. The wings are counter balanced on arm 51 with weights 52 on the opposite side of the wing's pivot axis to counter act the effects of the centrifugal force of rotation on the wing as above stated and will be described in more detail below.

Figure 3:
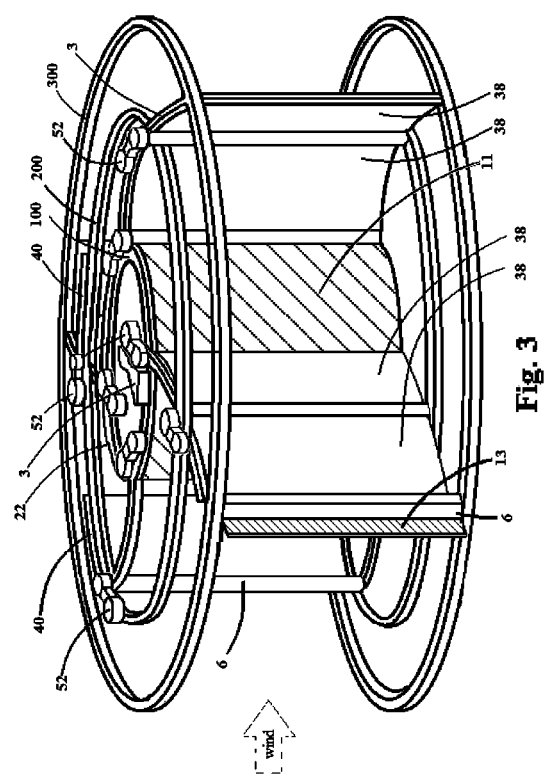
FIG. 3 is a perspective view of a two stage turbine assembly 43.

Often, as in this example of a multistage turbine's end assembly, concentric ring/s 100, 200 are incorporated in each opposed end assembly that support the pivoting wing assemblies 13 therein by bearing means as seen in FIG. 3. In multistage turbines each additional stage usually has one or two additional concentric rings attached to an extended end assembly. The pivoting wing assemblies are concentrically arranged at evenly spaced increments around and between the two end assemblies 8 attached on bearings often recessed in the concentric rings and/or end assemblies. Note: although the end assemblies in operation would likely be covered to confine the intake and discharge currents the covers have been removed to show the end assembly's structure and other parts of the turbine.

PAVA designs can have a variety of number of wings. The example of FIG. 3, like FIG. 1A, features the first and second stage with four wings, two wings are in glide with a wing in glide designation 40. The other two wings in the foreground are in drive identified with the wing in drive designation 38. These PAVA turbines can be configured in one, two or more series with each series having a plurality of pivot shafts 6 and wings 22, supported by the upper and lower concentric rings 100, 200, 300 etc. that are connected to the upper and lower cylindrical end assembly 8 shown here with end assembly covers removed for visualization purposes. The removed covers are installed between the concentric rings and counter balancing weights 52 that pivot above the covered end assembly as seen in the crosshatched end assembly 8 in FIG. 6. Each end assembly 8 like the single stage is part of the rotatable frame structure 7 which extends coaxially about the central drive shaft 10, the frame and end assemblies that are supported by the central drive shaft with bearing housing and bearing 12 at both its ends. On the final stage of a PAVA a wing assembly 13, seen at the bottom of the figure, can be added that extends the radius of the drive quadrants without adding to the radius of glide side of the sweep area. The wing assembly can extend out significantly further but is shown here small to not obstruct the view of the glide side of the turbine.

Figure 6:
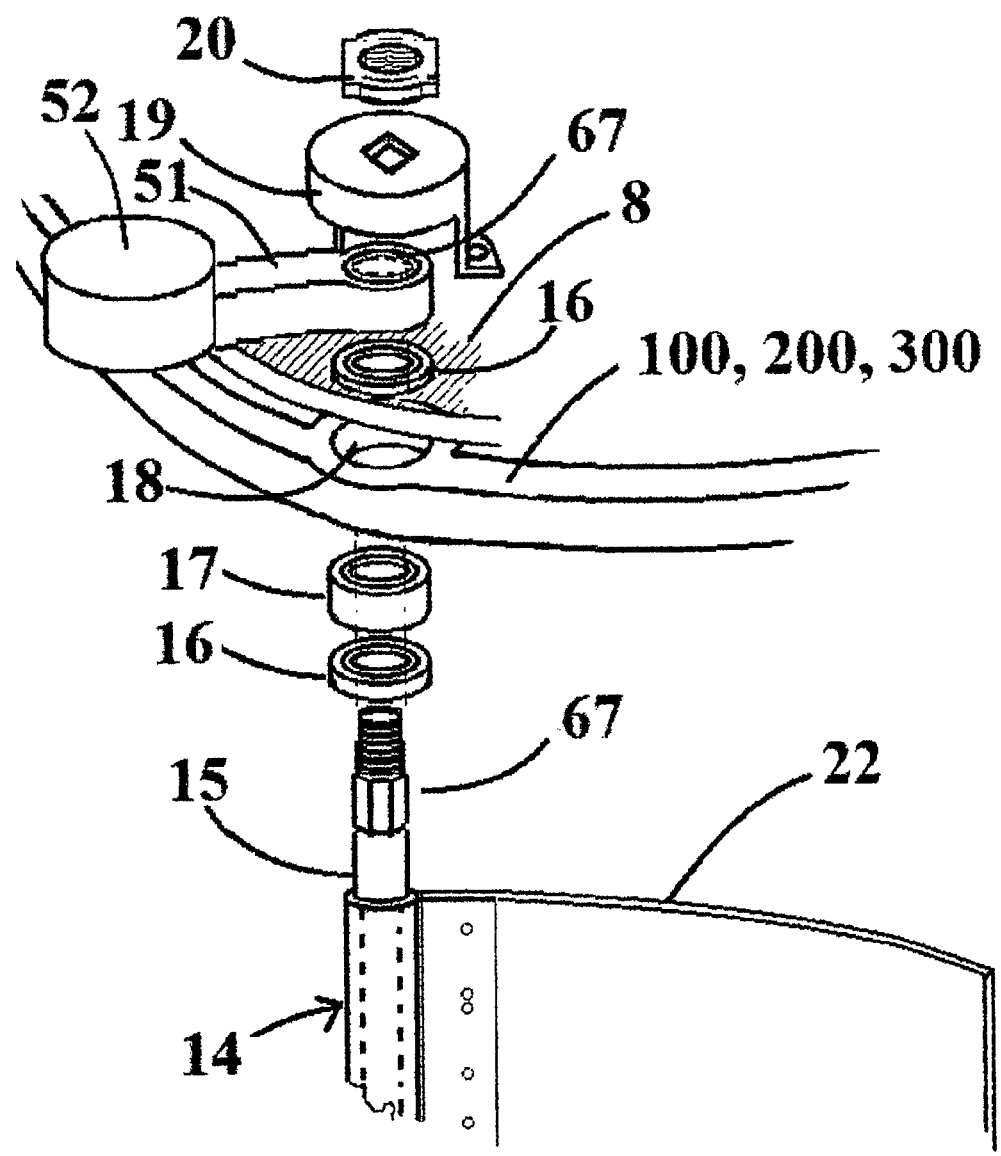
FIG. 6 detail of pivot assembly 14, pivoting wing assembly 13 parts and mounting detail.

Pivot shaft 6 attaches to the wing as seen at the bottom of the FIG. 6. Each end of each pivot shaft 6 in each pivot shaft assembly 14 rotates back and forth approx. 90° on thrust bearings 16 maintaining vertical shaft movement and clearance between it and the surface of the ring, hub arm 78 or end assembly 8 to which it is connected, pivot shaft 6 also pivots on bearing 17, recessed into its bearing housing 18 in the surface of ring 100 maintaining horizontal movement and clearance. Arm 51 connected to weight 52 is attached to the pivot shaft 6 in this example with a spline and socket set 67 with socket built into arm 51 that secures it to the spline at the end of the pivot shaft. A counterbalancing weight 52 and its extension arm 51 can pivot over one or both end assemblies 8 out of the wings operating space to counter-balance the pivoting wing to which it is attached. The weight is used to equalize the centrifugal force created by rotation on both sides of the wing assembly's 13 pivot axis.

The inter-stationary axle 15 of the pivoting assembly 14 in this example is secured to end assembly 8 with a square holed endplate assembly 19 that has built-in thrust bearings and washers providing the needed clearance for the pivot shaft to operate freely. End plate 19 is bolted to end assembly and the axle is secured as lock nut 20 is tightened down on the treaded end of the stationary pivot shaft's axle 15, so that each pivot shaft and wing is supported on its own axle which also serves as a stationary structural member of the turbine assembly extending vertically between the upper and lower end assembly 8. Only one end of each pivot shaft assembly 14 has been illustrated in FIG. 6 as each end is identically configured and each identical end of pivot assembly 14 is attached to each of the turbine's end assembly in an identical manner.

In FIG. 6 a concentric ring, like ring 100 or 200 attached to end assembly 8, is used as an example where the pivot assembly 14 is attached to the turbine frame. Assembly 14 can also be attached in certain models in a similar manner to the central foil 11, seen as the central crossed hatched area of FIG. 1. The outer perimeter of 11 can also serve as the mount of ring 100. Like earlier models both end assembly 8 and side structure 5 can have upper, lower or side wing drive-stops 3 and/or glide-stops 4 placed to correspond to the perimeter of the wing in its drive or glide position. The upper and lower edges of the wings can be slightly extended to be aligned with the drive stops and glide stops which can be recessed into the inner side of each end assembly 8 creating minimum drag profile by being positioned slightly out of the sweep area of the wings glide profile. Because the stops only face the sweep area in the drive quadrants the opposite side of the drive stop can be aerodynamically sloped to present a minimum of drag resistance in the glide quadrants.

In situations where the turbine assembly needs to be made more robust, side strut 5 can be structurally reinforced. Side strut 5 also can serve as an attachment member for accessories like wing stops, box fairings. Where accessories are add additional, bearings with matching collars can be placed around the top and bottom of the strut 5 between the wing and end assembly and between the strut and length of the pivot shafts if needed as attachment point for said accessories.

Stationary axle 15 can likewise be made more robust serving as an attachment member for accessories like above with collars and bearings positioned between the stationary axle and a tubular pivot shaft that runs on that axle with stationary collars used as mounting points for added attachments.

Because of constraints that will be described below, in many models each wing is limited in its rotational movement between a drive position in which the wing extends outward in stage one and in our example inward in stage two.

In the example of the double stage turbine as seen in FIG. 3, the second stage of the turbine pivots its four wings outward on the wing's pivot shaft attached to concentric ring 200. The outward limit of its pivot is defined by their curved matching arched drive stop 3 spanning from ring 200 to ring 300. The curvature of the wing is determined by the corresponding curvature, in this example of ring 200. In glide the wing pivots stop is a cushioned strip on ring 200 matching the placement of the wing.

Regarding FIG. 1A, it is significant that the drive positions present a maximum cross-sectional area to the incident wind to extract the greatest possible energy. Thus the drive quadrants represented in FIG. 1 as X times Y represent the combined 180° area of trans-drive and drive of the sweep area. Likewise, the trans-glide and glide quadrants represent the other 180°. In this example each wing assembly 13 in stage one is aligned to pivot closed to its glide position with the outer curvature of the wing pivoting to a position that is flush with the matching outer curvature of the central foil 11. The wing's counter balances 52 in both stages are attached to their pivoting shafts in a manner to pivot over or under their respective covered end assembly creating minimum drag resistance. Because the wing is pivoting closed in the opposite direction as the turbine assembly's rotation and because the wings are counterbalanced, minimum energy is lost in their transition from drive to glide. This minimum drag innovation enables the matching curvature of the wings to rap around the central wind foil, part 11, with minimum energy loss until they return "into the wind" and repeat the cycle rotating into the drive position once again.

The dual stage model's combined effect of the eight wings and eight pivot shafts is that every 90° incremental rotation of the central drive shaft 10 brings two new vertical wings entering into the drive position. Likewise, the counter balanced wings move into glide as the wings on the opposite side of the turbine are opening into drive.

Note: The turbines illustrated in this application have four wings in each stage, however the PAVA design is not limited to having four wing assemblies 13 in each stage. Turbines with two, three, four or more wing assemblies 13 arranged around the circumference of each stage are also viable options depending on the circumference of the sweep area. Because of shadowing concerns the three winged PAVA stage is ideal in some applications.

Dual stage PAVA models have a turbine frame structure 7, seen in FIG. 5, that incorporates the stage one frame at its center and is otherwise similar in structure and function as the first stage turbine frame shown in FIG. 1B. Main bearing 12 is shown in this figure. On the right side of FIG. 4A, in the exploded section of the drawing, is an example of a second stage PAVA for models with wings that pivot out away from the central axis, in this example from ring 200. A reinforced drive stop assembly 3 on the upper and lower end assembly 8 has been reinforced and re-designated as part 1. Part 1 is structurally enhanced because side drive stop 3 and side structure 5 has been eliminated streamlining the glide profile thereby reducing drag in the glide side of the sweep area. The resulting turbine model is seen in FIG. 4B. Pivot shaft 6 and/or stationary axle 15 often are strengthened under these circumstances.

Figure 7:
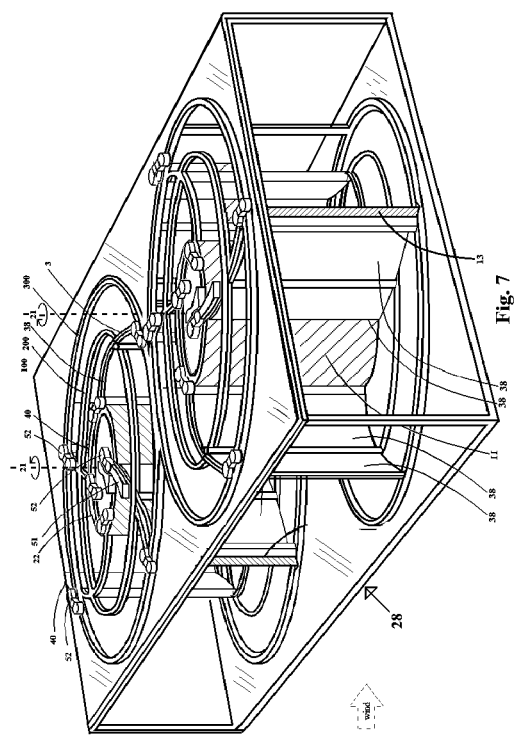
FIG. 7 illustration of twin PAVA design with stationary turbine housing 28.

FIG. 7 shows two turbine assemblies 43 in a stationary twin turbine housing structure 28. The likes of assembly 28 has been claimed and documented in past applications and is presented here as a point of information. All turbines with PAVA wing designs can be housed in the same manner as the turbines of earlier applications with stationary frame structures supporting a single turbine or a plurality of turbines in the same variety of singles, dual end to end, side by side and arrayed configuration.

Each turbine assembly optionally includes the above mentioned strut like side support structure 5 at the outer periphery of frame structure 7, extending longitudinally between the two end assemblies 8. The end of the wing's pivot shafts are secured in bearings supported in the frame on the upper and lower end assembly 8 in a manner to define a rectangular perimeter in conjunction with its pivot shaft 6. This perimeter defines a rectangular opening that is generally open for fluid flow. The perimeter defined by the side structure 5 and stops 3 is dimensioned to be slightly smaller than the respective wing 22, on their respective pivot shafts, whereby the framing wing stops typically engage the three free edges of the wing when it reaches its drive position. Thus the strip stops comprise a mechanical stop that absorbs the force of the wind on the wing and transfers the force through the structure 7 to the central drive shaft.

Stop 3 also enables use of lightweight panels for all of the wings, since the wing is not required to transfer all the force it develops through its single-sided connection to the pivot shaft. Rather, the wing transfers the force all around the perimeter of the wing, particularly along the three free wing edges that impinge on the cushioning strips of the backstop assembly. Thus the wing is relieved of the typical requirement to be sufficiently stiff and strong to transmit all the force it generates through its connection to the shaft of a mechanism, and the wings of this invention may be free of heavy structural reinforcement.

The wing stops 3 provide another contribution in that they receive the majority of the wind force from the wings in the drive position, and transfer that force to the outer cylindrical frame structure 7, thus unloading many potential stresses from the pivot shafts 6 while creating the torque that drives the cylindrical outer frame 7 to rotate the central drive shaft 10.

With continued reference to FIG. 4B, an optional component of the structure is a plurality of cushioned or opposed magnetic drive stops 3 serving as the stopping surface and usually serving the upper, lower and leading edge of the wing in drive. The upper and lower drive stop 3 are supported on the end assemblies 8 with the side members running longitudinally from one end assembly 8 to the other, each located at the drive positions of each wing. In some models side assembly 5 can be removed and the stops 3 that serve the upper and lower wing reinforced, and the sides of the wing are also reinforced to take up the extra load from the removal of the side stops and assembly 5. The removal of side support 5 is significant because it reduces drag by leaving the glide side of this stage completely unobstructed between the end assemblies when each wing is in its glide position 40 as seen in FIG. 4B. This arrangement is seen in the right side exploded portion of FIG. 4A and is designated as part 1. The resulting machine with its enhanced drive stop incorporated in part 1 is seen in FIG. 4B. In FIG. 3 is an example of one wing of a drive stop that is built into the end assembly that matches the profile of the weight 52 and weight arm 51 of the wing in the first stage. Each wing of any stage could be likewise equipped.

Creating machines that are both powerful and quiet is a major focus of our research. In this effort opposed charge magnetic strips or individual magnets surrounding the perimeter of the wing, with matching opposed electro magnets or magnets attached to the corresponding drive stops 3 and glide stop 4, can be so charged as to repel each other, in so doing create a quieter wing stop mechanism. This embodiment is one useful approach for noise suppression. Another approach is the use of cam systems that accurately controls and regulates the wing position throughout the wing's complete rotation. A cam system can regulate the wing to stop close enough to its drive stop position to prevent significant current escape between the wing and the adjacent fairing or foil without the wings ever creating noise by actually making impact. A detail of a cam system with illustration will be described and provided below.

For use on larger machines, a hydraulically cushioned backstop system that uses hydraulic pressure which increases and decreases commensurate to the increase or decrease of RPMs and centrifugal force is a viable option and the subject of our current research.

Box Fairings

Joined to the frame on the second series of the two staged PAVA models are an example of an optional fixed box fairing seen in FIG. 5, part 2, each extending longitudinally and aligned with the tip of its respective wing secured to side support structure 5 on frame assemblies 7, and at the top and bottom to end assembly 8. Like the box fairings from past applications the fairing panels, together with the adjacent portion of the end disk assembly 8, forms a rectangular, coffer-like wind trap. When the wings reach the drive position and impinge on the cushion strips of wing stops 3, the entire rectangular opening is closed and sealed by the wing, leaving no path there through for escaping airflow.

The airflow would naturally tend to spread laterally and spill off the wing, but the presence of the box fairing 2, seen in FIG. 5, helps prevent lateral flow off the wing and maintains the wind pressure for a longer time during the drive position part of the cycle. This effect increases the amount of energy harvested from the wind incident on the turbine.

Note: there are many examples of concaved wing curvatures appearing throughout the figures in this document. The concaved wing may hold a greater volume of current. The convex wing however may have structural and aerodynamic advantages suitable for certain applications, for its convex shape may withstand greater current pressures in drive by transferring the stress load out to the side supports of the turbine frame and, too, this shaped wing in glide can in some circumstances match the curvature of the concentric ring to which the wing's pivot shaft is attached.

Figure 8:
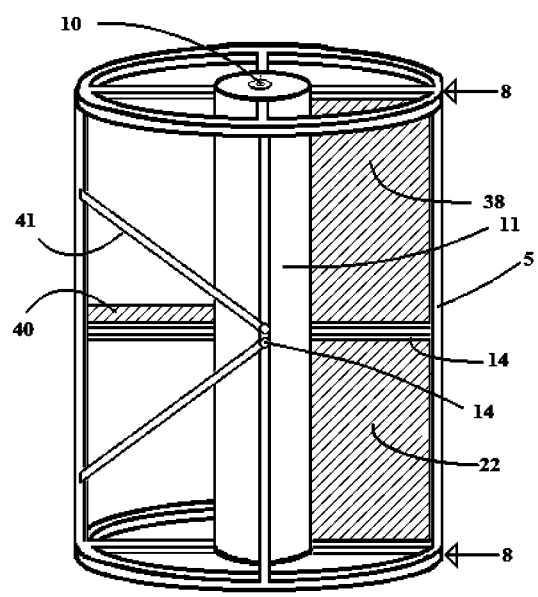
FIG. 8 is a simplified perspective view of the turbine with CAPA wing placement.

FIG. 8 is a likeness of the turbine with the CAPA central and perpendicular pivot axis design. The wings 22 and two parallel pivot shaft assemblies 14 in this model are centralized and perpendicular to one another and perpendicular to the central drive shaft 10. The cross hatched wings on the viewer's left are in wing glide position 40, the crosshatched wings to the right are in wing drive position 38 and the two wings in transition are identified in trans-drive wing position 41.

Figure 9:
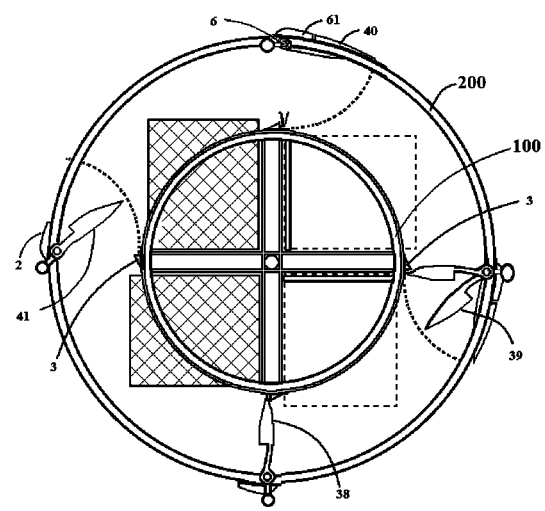
FIG. 9 is a hybrid that combines the turbine of FIG. 8 in a two staged PAVAH-hybrid

FIG. 9 shows the PAVAH hybrid with the turbine of FIG. 8 as its first stage. PAVAH is an acronym for Parallel and Vertical Axis Hybrid. FIG. 9 features the hybrid PAVAH that incorporates a CAPA pivot shaft placement design seen in a simplified version in FIG. 8 as the first stage of this turbine and adds on to it as its second concentric stage the later PAVA design featured in this application. The first stage is comprised of that portion of the figure that is within ring 100, and includes the crosshatched top of the wings in glide, with the dotted line designating the operating space of the wings opposite them in drive. The second stage PAVA comprises all that is attached to ring 200 and also includes the four drive stop 3 attached to ring 100.

In this top view of the hybrid PAVAH, the four wings of the second stage are shown in their four corresponding 90 degree quadrants of drive 38, trans-glide 39, glide 40, and trans-drive 41. The pivoting wing assembly 13 in the left of FIG. 9 pivots on ring 200 and is shown in its trans-drive wing position 41 with its trans-drive radius delineated with dotted lines. This wing pivots outward in glide and pivots inward to drive-stop 3 mounted on ring 100 in drive. The retracted wing assembly in glide in this example forms a teardrop shaped housing 61 as seen at the top of the figure.

Teardrop Wing Housing 61:

In the interest of increased efficiency the outer inter-stationary box fairings from the earlier models has evolved from a vertical rectangular panel to its later embodiment where it is incorporated into the wing assembly's teardrop shape housing as seen in FIG. 9. The earlier designed fixed box fairings attach to the side of the wing's drive-stop and strut structure 5 of the turbine assembly to inhibit lateral escape of captured current of the side of the wing. The teardrop profile creates lift, lessening drag in its gliding rotation. In trans-drive the tip of the teardrop shaped housing catches the current and allows for speedy deployment to drive. When the wing deploys in drive the inter-stationary forward section of the teardrop housing cavity, catching a high volume of current, acts in the same way as the earlier designed box fairing to inhibit the lateral escape of current of the side of the wing.

The teardrop design single wing wind foil 61 in FIG. 9 is attached to rim 200. The greater curvatures of the outer glide profile of the teardrop shaped wing housing 61 create a higher velocity, lower pressure on the outside of the foil to lessen drag and increase forward rotation in glide. In the drive side of the sweep area wing assembly 13, in our example, pivots from concentric ring 200 inward to concentric ring 200 where it makes contact with stops 3 seen in its drive position 38 at the bottom of the figure.

Counterbalanced Wing Assemblies

The natural tendency of any mass that is rotated on a pivot point extending from a primary axis is to swing outward away from its axis by the centrifugal force of rotation. To counteract and thus neutralize the centrifugal force created by the rotating mass of pivoting wing assembly 13, a counter balance weight 52 of appropriate mass, on an extended arm 51 of appropriate length, is attached to the rotating wing assembly on the opposite side of the pivot axis from the side that contains the wing. Thus as seen in FIG. 10A, wing assembly 13 is always counter balanced in its reciprocal 90° movement on both sides of its pivot axis. With the centrifugal force created by the rotation of the turbine placed on the side of the pivot axis containing the counter balancing weight 52 and the centrifugal force created by the mass of assembly 13 on the opposite side of the axis equalized, the centrifugal force on both sides of the wing assembly's pivot axis is thus exponentially equal with the increase and decrease of RPM.

The counter balancing weight 52 can swing over the upper and under the lower end assembly 8 and be of a larger circular shaped disc of equal mass but with a streamlined lower exterior profile. A close up view of the pivoting shaft assembly 14 of wing assembly 13 is featured in FIG. 6. In further reference to FIG. 10A, the dotted lines within ring 200 represent the operating air space of the pivoting wings of the CAPA turbine from FIG. 8.

Figure 10B:
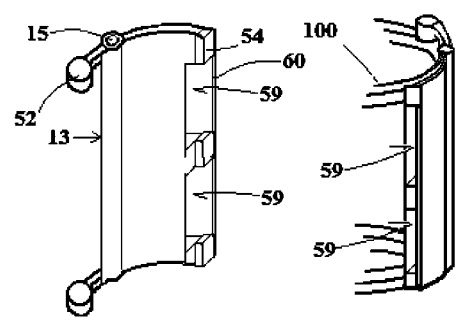
FIG. 10B is an example of an inner and outer wing detail.
Figure 10:
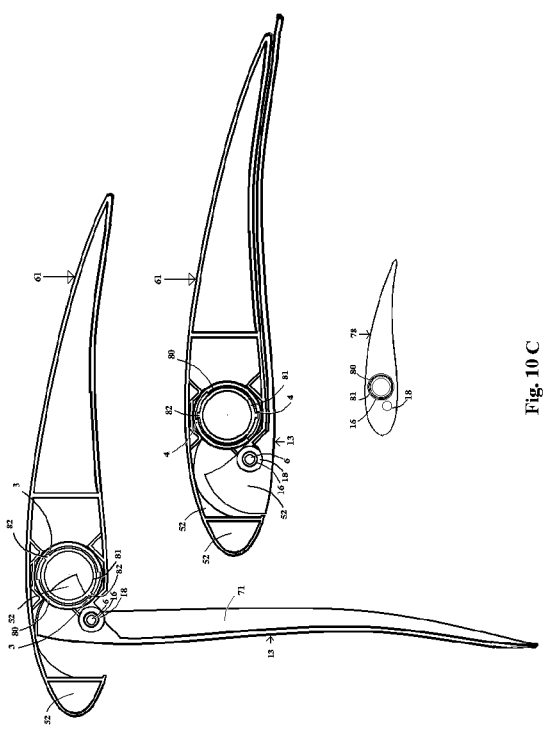
FIG. 10A is a top view of the turbine featured in FIG. 9 with two PAVA stages added.
FIG. 10C is a detail of the teardrop shaped single wing assembly 61.
FIG. 10D features three assembly 61 from FIG. 10C in a triangulated turbine design.
FIG. 10E is a detain of teardrop shaped dual wing housing 70.
FIG. 10F is a perspective rendering of opposed wing assembly 13 in housing 70
Figure 10:
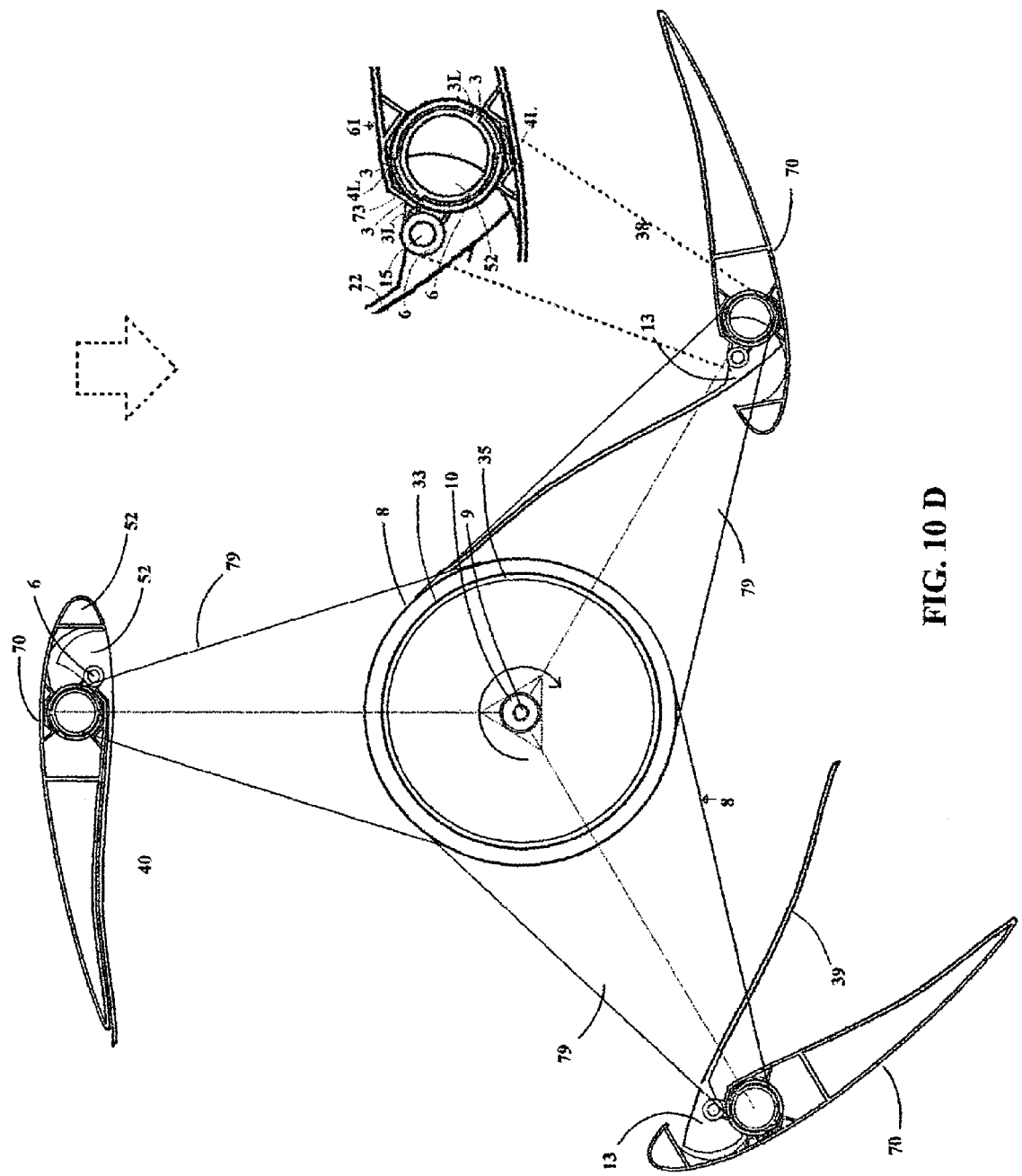
Figure 10:
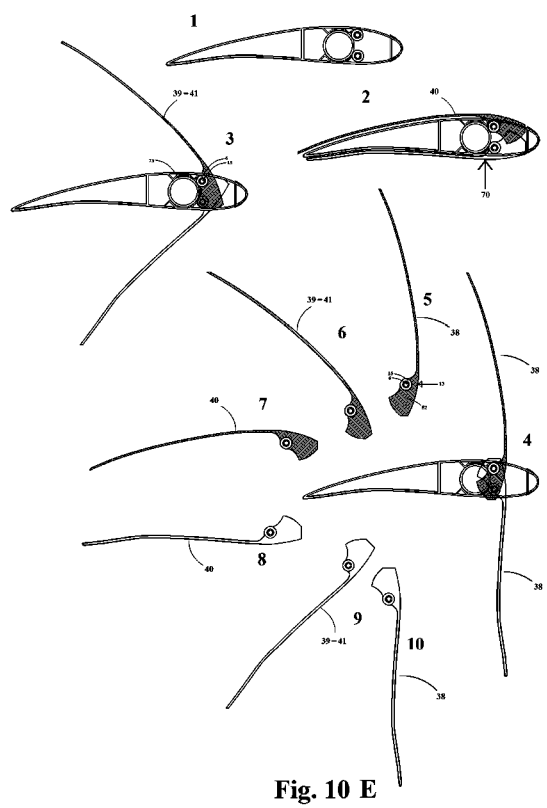

Also seen in FIG. 10 A the recesses in the end assembly's concentric ring 100 correspond to the inner curved profile of wing assembly 13 in stage one so that in glide the wing assembly presents a smooth outer surface with the same curvature as the corresponding ring creating a reduced glide profile with as little drag resistance as possible similar in this way to the turbine seen in FIG. 1. On the second stage the wing of the wing assembly 13 pivots out away from the turbine's central axis in drive and retracts in glide, integrated in its housing, with the outer profile of the wing matching the outer profile of the housing's teardrop shape. The arrow at the top of the figure shows the direction of the current. The number 40 glide at the bottom of the figure and 38 drive at the left indicate the position of the wing assembly 13 in their rotational cycle. At the right side of the figure the teardrop housing assembly 61 and wing assembly 13 have been pulled out of place, signified by the dotted lines, and duplicated to show the teardrop wing housing 61 with its integrated wing assembly and the wing assembly 13 separated from its housing. Counter balancing weights 52 on the second stage would typically swing over their corresponding covered end assembly 8 and in operation have their own aerodynamically fashioned cover to present a smooth surface on the upper and lower exterior of the rotating turbine assembly.

One of many possible wing designs is seen in FIG. 10B. In this Figure are two image details showing both sides of a wing assemble 13 that pivots here on ring 100 like as seen in FIG. 10A. Image on the left shows the inner side of the wing, and image on the right shows the wing tip and outer side of the wing. The wings of this design have air scoops to assist in rapid drive deployment. When the wing is retracted in glide the air scoops face away from the current and presents a smooth profile.

A close up view of the outer side of the wing in image on the right shows the oncoming current entering into the now counter facing air scoops 59 assisting in the wing's immediate initial deployment into trans-drive. When the wing reaches full deployment its contact pads 54, seen in left image, serve to cushion it as it comes to a stop on the outer housing 61 attached to ring 200 as its seal 60 that runs down the full length of the leading edge of the wing seals the full length of housing 61 creating a sealed coffer like structure that decreases the lateral escape of fluid current between this connection thereby increasing wing loading and harvested energy. In FIG. 10A the wing assembly 13 pivots out away from the central axis of the turbine. FIG. 10C is an example of a wing assembly 13 in a tear dropped housing 61 with a pivoting wing that pivots inward toward the central drive shaft 10. In this model both the pivoting wing 13 that is built into the teardrop housing 61 with housing 61 pivots out in opposing directions in drive on a separate axis to engage the oncoming fluid current.

Both pivot wing assembly 13 and pivoting housing 61 are counter-balanced having corresponding weights 52 to neutralize the centrifugal force of rotation on both sides of their pivot axis. Note: the upper and lower cover 78 of the housing assembly 61 are removed in this figure to reveal the working parts within. When deployed in drive, the inside of the housing with its teardrop weighted nose becomes a spherical cavity like structure that is facing directly into the current capturing the oncoming fluid current inside the cavity of the housing. The pivoting assemblies 13 and pivoting portion of housing 61, each have glide and drive stops that define their pivoting radius and self trim in glide to the position of least resistance. Alternatively each can be equipped with gear, cams, flat belts and the like to regulate their glide and drive cycles. Housing 61 in this example pivots on a tubular mounting 81 that functions as an axle structure pivoting on thrust and roller bearing 16 between it and the upper and lower end cover assembly 78. The stationary tubular axle structure 81 runs through the vertical length of the housing, through the end covers and end bearings 16 as does the wing pivot shaft 16 that also runs through its bearing 16 and stationary housing 18 that are also recessed in each of the housings two end assemblies. The tubular stationary axle 81 is fixed to one of the pair of triangulated hub arms 78 of the triangulated turbine end assembly 8, shown in the next figure.

FIG. 10C depicts teardrop wind foil 61 drive and glide-stop mechanism. In the upper figure in this illustration the wing is deployed with both the stationary male stop 82 of axle 81 and the female rotating limit stop 3 of the shaft 80 are stopped against each other in their drive stop position. In the middle of the figure is shown 61 with its wing detracted in its glide profile with the stationary male limits 82 of axle 81 in glide stopped against the glide stop 4 of the pivoting shaft 80. When the housing is in glide its closed wing creates a smooth surface assuming the housing curved profile. As seen in the upper image of this figure from this top view perspective, a portion of both the stationary tubular mounting structure 81 and pivoting tubular housing shaft 80 have been removed to provide room for the wing's weight 52 to rotate into the inner cavity of the tubular structures. The pivoting wing 13 has flaps 71 to capture current and also reinforce the wing to withstand its current load. In drive position the flap closes over or within its respective end assembly in its glide profile.

Although there are several ways to configure this mechanism in this example the wing's pivot on pivot shaft 6 on pivot bearings 16 held in bearing housing 18. The pivoting shaft 80 attached to the housing also pivots on its larger pivot bearing 16 held in its bearing housing 18 secured to the stationary tubular axle 81 which is secured to the two mounting flanges 73 that are attached to the triangulated arm 79 seen in the next figure of the turbine end assembly 8. End assembly cover 78 at the bottom of the figure covers the housing 61 and presents a smooth surface in glide.

As seen in FIG. 10D turbines of this design can have stationary central foils 11 or rotating foils 33 attached to the turbines central stationary axle 9. The central foil 33 surrounding the central drive shaft of the turbine can also be equipped with an optional deflection panel that is seen in FIG. 11D. Both the stationary central foil 33 and its optional deflection panel 88 are explained in detail in the next figures. These turbines can also be equipped with cam systems also described in detail below that incrementally regulate and control the wing positioning throughout their 180 degree rotation.

In further regard to FIG. 10D the teardrop housing 61 with their integrated wing assemblies 13 from the preceding FIG. 10C have been incorporated into a wind turbine with three wing assemblies arranged 120 degrees apart on hub arms 79 of a triangulated end assembly 8. The assembly 61 at the top of the figure is in glide 40, the assembly 61 to the right is in drive 38 and the assembly to the left is in trans-drive 39. The wing of the assembly 61 to the right has come to its drive stop 3 on the rotating central wind foil 11 surrounding the main shaft of the turbine. The body of assembly 61 in this example is hinged to pivot in the opposed direction to its housed inner wing but also can be fixed to arm 79 of end assembly 8.

In regard to the enlarged portion of FIG. 10D, the inner flap 22 is joined to the hinged tubular pivot shaft 6 that in this design is half of the wing's pivot hinge, the other half belonging to axle 15 which is joined to the outer side of mounting column 73. Weight 52 of the inner flap has its drive stop that corresponds to stop 3 mounted on the interior housing 61 seen at the top of the figure. The body of housing 61 pivots out into drive position 38 with its larger tubular shaft 6 pivoting around mounting column 73 that has drive stop limit 3L and glide stop limit 4L built into its interior curvature limiting their pivot rotation. The interior cavity of housing 61 now facing into the current catching a volume of current in drive until both flap 22 and the teardrop shaped housing 61 return to their glide stop limit 3L to track to the position of least resistance throughout their glide cycle until they again return to their trans-drive cycle to repeat their rotational excursion.

Notes: 1) The figure is illustrated with transparencies so the arms 79 of the end assemblies 8 do not block the view of the teardrop wing assembly's 61 below. In this figure the central axle 9 and central drive shaft 10 are shown. 2) End assembly 8, rotating on ring bearing 35 around joined stationary foil and axle 9 functions as the rotating turbine's central drive shaft. With an added connecting structure from the end assembly 8 over the stationary central foil to an extended central drive shaft having a corresponding bearing and bearing housing with an attachment plate, the turbine can be tethered from its central axis by triangulated cables to a grounding structures. An extended axle with attachment plate can also be use for this purpose. All the previous examples of teardrop shaped housing 61 have housed one wing assembly 13. In the next FIG. 10E two wing assemblies 13 are incorporated into a similar teardrop shaped housing. The two wing assembly housing is referred to as housing 70.

FIG. 10E depicts 8 different dispositions of the wing. Disposition 1 at the top of the figure is a two winged teardrop housing 70 shown without its pair of opposed wing assembly 13 installed. Disposition 2 is the complete housing assembly 70 with two flaps in their glide wing position 40. Disposition 3 is the complete housing assembly 70 with the flaps in their trans-glide wing position 39 or trans-drive position 41 depending if the flaps are deploying or retracting (both conditions looks the same). Disposition 4 shows assembly 70 with both opposed flaps deployed in drive 38. The next three images show the outer (crosshatched) wing in four different flap positions: in disposition 5 the flap is in drive 38, disposition 6 in trans-glide 39 or trans-drive 41, depending on whether the flap is deploying or retracting and disposition 7 showing the flap in its glide position 40. The last three images at the bottom of the figure show the inner flap in three positions: disposition 8 in glide 40, disposition 9 in trans-glide 39 or trans drive 41 depending if the flap is deploying or retracting and disposition 10 shows the wing in drive 38. In the example of disposition 3 each wing assembly has its own pivot shaft 6 and stationary axle 15 connected to the upper and lower end assemblies 8 and end assembly cover 78 that in this figure have been removed for visualization purposes. Each flap of each wing assembly 13 has an outer profile that matches the profile of the teardrop shaped housing 70 when the opposed wings are in their glide position 40 as seen in image 2.

Figure 10F:
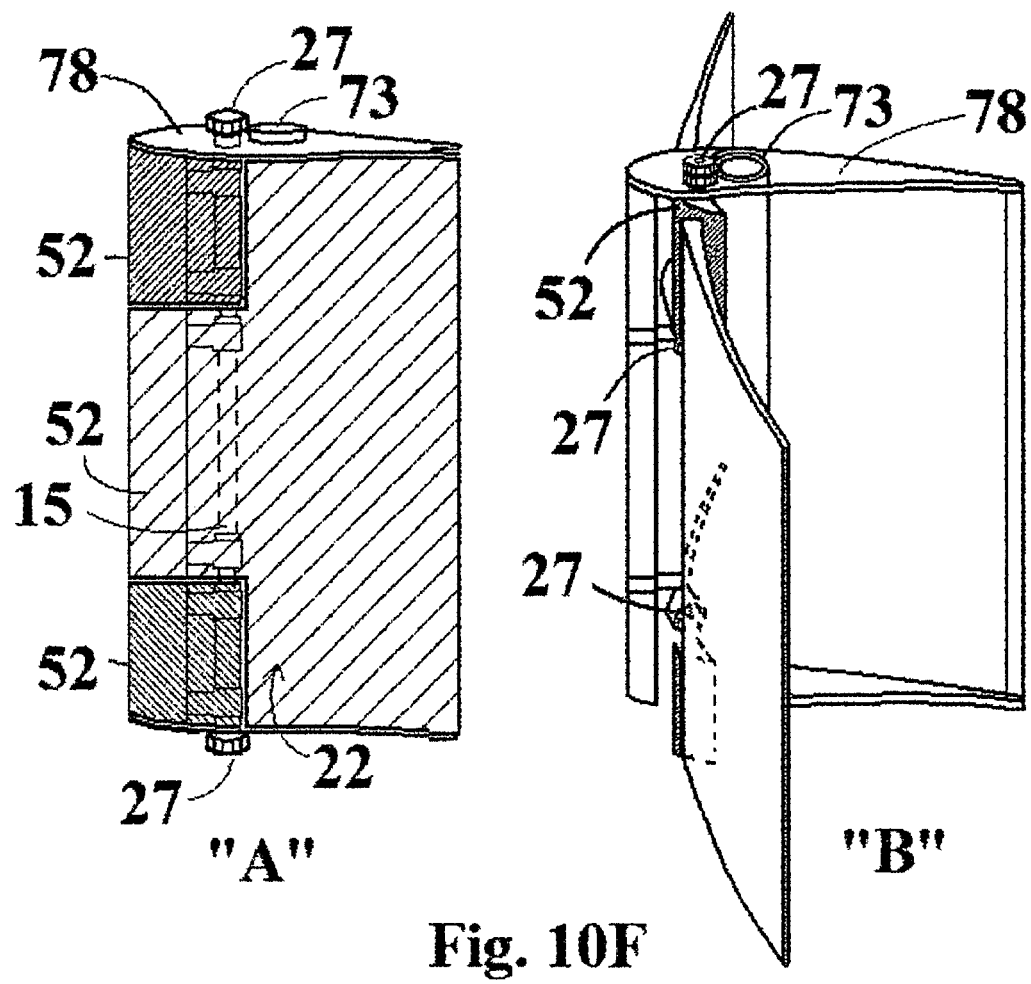

Two designs of opposed flaps pivoting from a teardrop shaped housing are illustrated in FIG. 10F which shows the flap in two different dispositions. Disposition A shows a hinged pivot shaft arrangement. Each opposed flap shares a common hinge shaft, like both sides of a common door hinge shares a hinge pin, each flap sharing a common axle 15. In this example the flap on the opposite side pivots out away from the viewer as its deploys, with its counterbalancing weight 52 in the shaded upper and lower part of the housing pivoting inward towards the viewer. The weight 52 on the other flap has a larger counterbalance that is comparable in weight to the two weights on its opposed wing and pivots away from the viewer when deployed in drive as its flap pivots toward the viewer.

When in drive the inner profile of the flap moves transverse to the current creating maximum drag. When retracted each flap creates minimum drag by forming a perfect teardrop smooth exterior profile. Part 73 is the mounting column that extends vertically as it is shown here through the housing, its other end exiting the housing's lower end. Each end of the mounting column is attached to its corresponding end assemblies 8 as shown in the following figures. In this design the pivot shaft end gear 27 on the top controls one flap and the pivot shaft end gear 27 on the bottom controls the other. When geared through traditional methods each wing can be controlled to pivot into and out of drive and glide in tandem.

In disposition B of FIG. 10F the flap pivoting movement and counterbalancing weight dynamic are the same as disposition A except each wing has its own hinge, one half attached to the wing the other half attached to the mounting column. The wing with the split weight has a driver gear 27 joined to the pivoting split hinge and attached wing. The broken line in this illustration is a transparency showing the counterbalancing weight pivoting toward the viewer through the deployed inner flap as the opposed flap is pivoted out the other side away from the viewer. In this design the connecting belt or gear or bell crank engages the driver gear 27 shown at the top of the figure. The gears 27 that gear one opposed wing to the other in this design are located between the inner and outer wing's counterbalancing weights as seen in disposition "B". Note: there are many ways to gear these opposed wing together. These examples are presented as only two possible ways.

Central Foil

Note: The cylindrical central wind foil shown in FIGS. 1 and 3 as assembly 11 that rotates with the turbine may be modified creating a second useful cylindrical central foil 33 that is stationary. As stated above a characteristic of the PAVA design leaves a large fraction of the sweep area in the glide quadrants free of any moving parts.

The vacancy in the glide side of the swept area between the central drive shaft 10 and the wing assemblies 13 operating space characteristic to the PAVA wing placement design offers a perfect place for stationary objects that assist in wing loading such as stationary foil 33 and deflection panel 88. These embodiments include the split inter-stationary Semi-cylindrical central foil 33 featured in FIG. 11A serving the CAPA designs and the inter-stationary Semi-cylindrical central foil 33 featured in FIG. 11B serving the PAVA designs, each of which can be joined with the optional deflection panel 88. Note: The embodiment 33 can also serve on the inventor's other turbine designs in air or water applications.

The central foil 11 seen in FIGS. 1 and 3 and the central foil 33 are closely related. Both occupy the central portion of a vertical axis turbine between the central drive shaft 10 and the contact area of the wing assemblies, and both assist in wing loading that increases the fluid current intake pressure into the drive side of the sweep area.

The difference between the rotating cylindrical central foil 11 and the cylindrical central foil 33 is that the central foil 11 rotates with the turbine and constantly increases the current pressure in both the drive side and the glide side of the sweep area whereas the central foil 33 is stationary and can be configured to increases the intake pressure only in the drive side of the sweep area. Note: Regarding FIG. 11A and 11B: the front and rear side of structures 5 in FIG. 11A and stationary axle 15 in FIG. 11B have been removed for visualization purposes. The example of wind foil 33 in FIG. 11A is installed is a CAPA model as the first stage of a PAVA Hybrid model. 11 A can be adapted as shown in FIG. 11B to accommodate other models including the first stage of a PAVA model.

In FIG. 11A the central foil is split in two halves allowing operating room for the CAPA design's central hub and perpendicular pivot shaft assembly. The lower and upper fixed portions of the wind foil are functionally and structurally identical and are a mirror image of one another.

Figure 11:
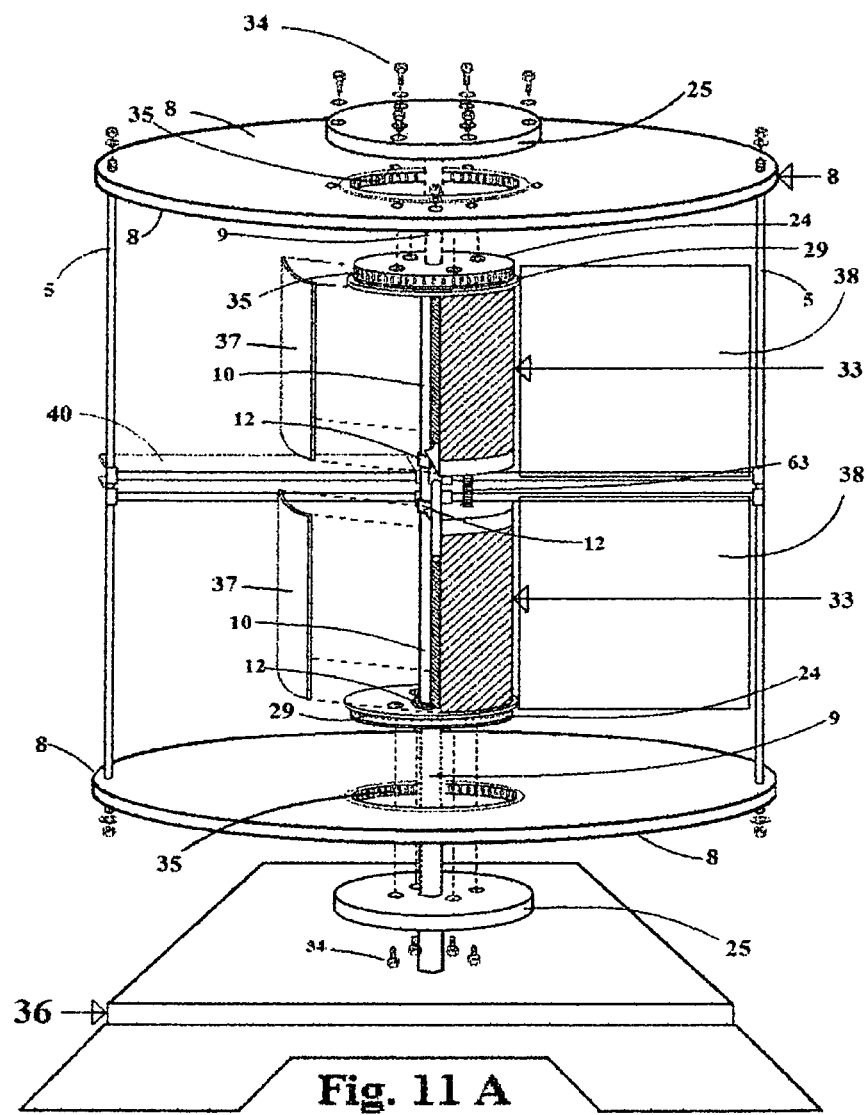
FIG. 11A is a detail of stationary central foil 33 for PAVAH (PAVA+CAPA hybrid).
FIG. 11B is a detail of stationary central foil 33 for PAVA turbines.
FIG. 11C is an illustration of a stationary central foil 33 with deflection panel 88.
FIG. 11D is an illustration of the apparatus of FIG. 11C with two wing housing assemblies 70 installed.
FIG. 11E is a perspective drawing from the leeward or back side of FIG. 11D with all four wings assembly.
Figure 11:
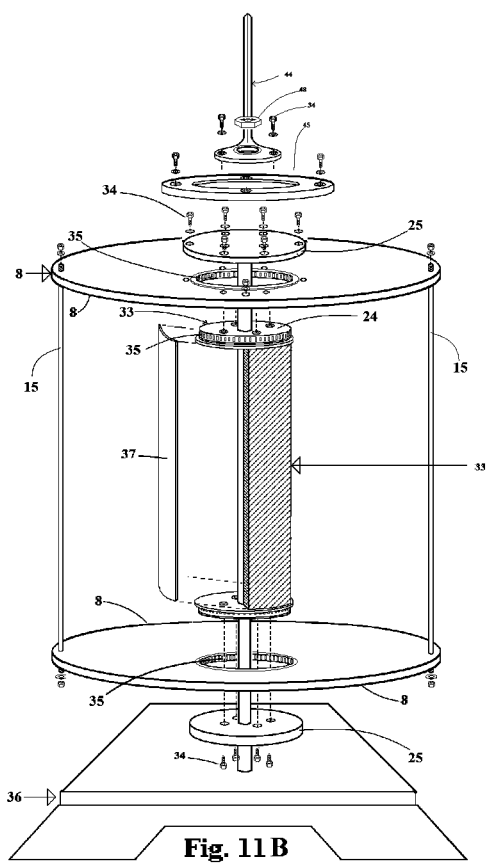
Figure 11:
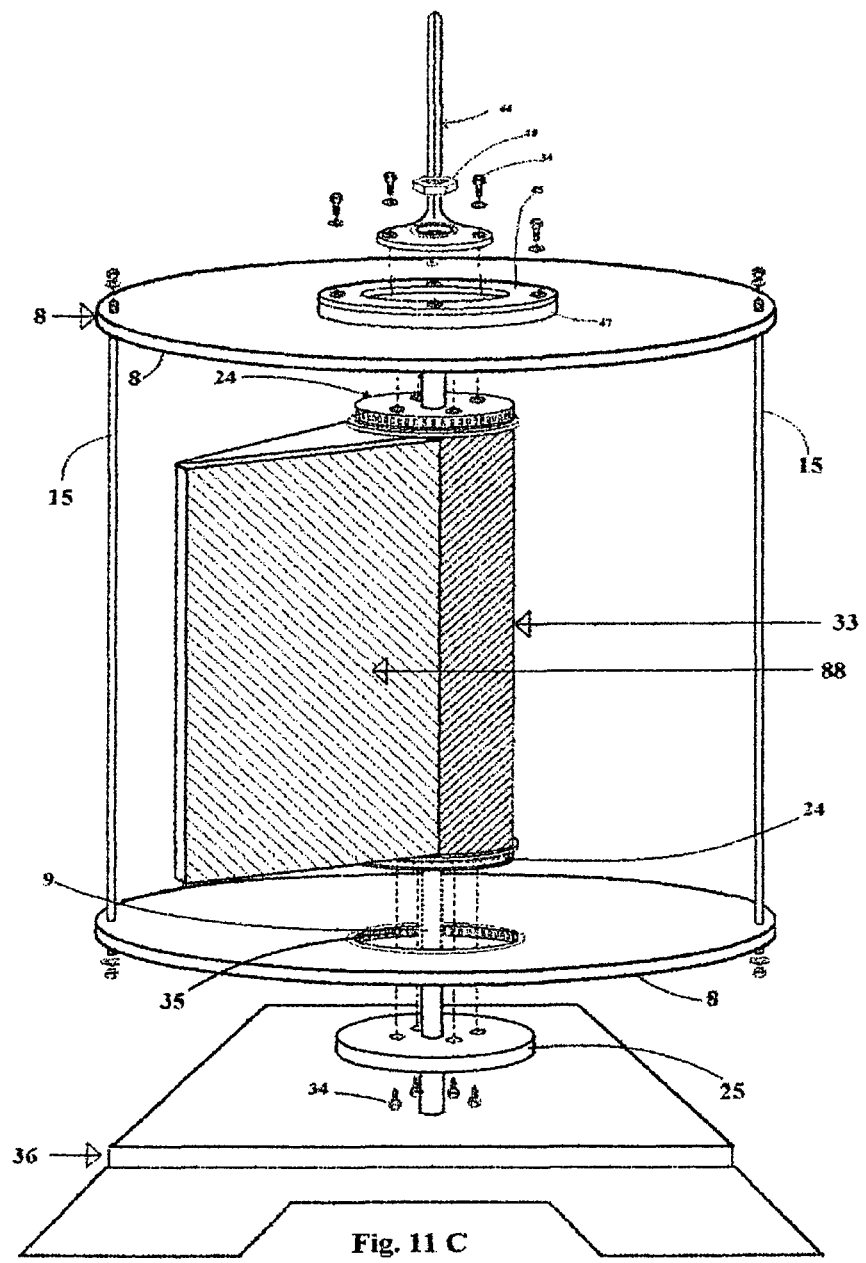
Figure 11:
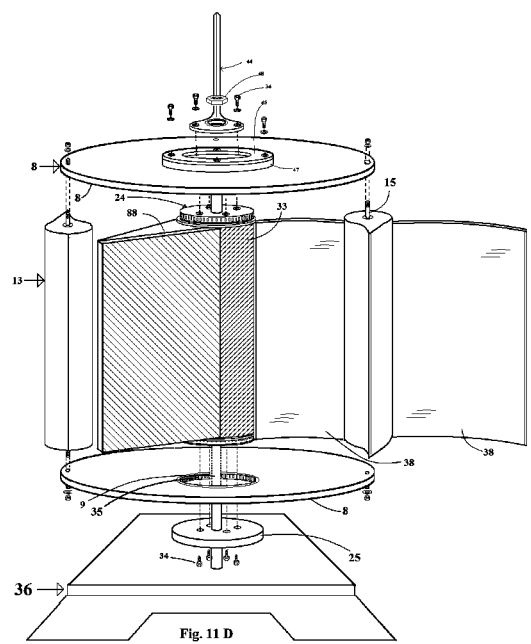
Figure 11:
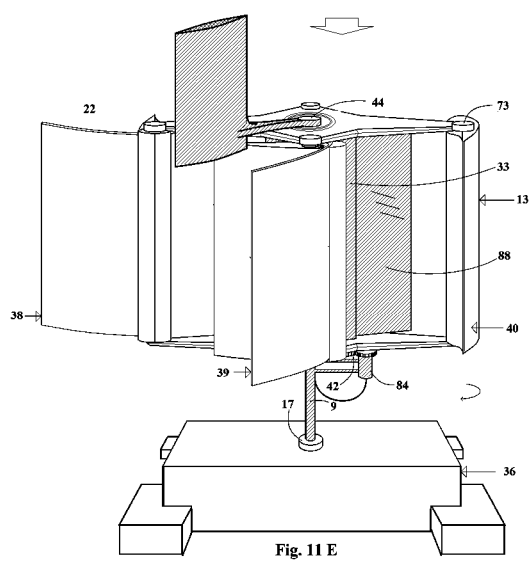

In FIG. 11B the PAVA semi-cylindrical central foil 33 extends from one end assemble 8 to the other serving the PAVA design. The side structure 5 on the CAPA model FIG. 11A becomes the stationary pivot shaft's axle 15 to which a variety of wing assemblies can be mounted and still serve as a side structure connecting the two end assemblies 8 as will be described below in the PAVA model FIG. 11 B.

In regard to FIG. 11A and 11B: The upper central foil 33 is attached with fasteners 34 to the upper stationary axle plates 25 that is keyed and locked to the end of stationary axle 9 at the top on one end of the axle and at the bottom where the lower part of the axle exits the rotating turbine assembly 8. The lower half wind foil 33 is likewise attached to the lower stationary axle plate 25 with fasteners 35 and vertically adjusted with a threaded locking collar (not shown) around the axle below the axle plate and thrust washers and bearings 29 to adjust the operating clearance of the rotating turbine assembly. Also in both the models featured in FIG. 11A and 11B the central foil supports the rotating turbine assembly on thrust washer and bearings 29, rolling on the bearing flanges surrounding the central foil's end section 24 and on roller ring bearings 35 between the end assembly 8 and the foils end section 24.

The central foil is a drum shaped stationary cylindrical structure that is placed between the wings operating space and the central axle. The larger rotating cylindrical turbine assembly rotates around this stationary centralized structure. As seen in FIG. 11A, the stationary central foil 33 serving turbines with the CAPA wing design are split into two sections, one section above and one section below the centralized hub and pivot shaft assembly. The upper and lower halves of the split foil are identical. Each half of the central foil has an end plate 24 joined to the central foil. The end plate on the upper half is at the top of the upper foil section and the end plate of the lower foil section is at the bottom. Each end plate is joined at its center to the stationary axle 9. Each end plate is machined with a flange for roller bearing 35 and thrust bearings 29 that support the rotating turbine assembly.

The central drive shaft in this model is also split. The split drive shaft 10 is joined at its outer side to its corresponding end assembly 8 with ring bearings 35 and thrust washer and bearings 29 between it and the stationary upper and lower foils end section 24 that are joined to the axle. In this model the central drive shaft becomes part of the rotating end assembly 8. The rotating turbine assembly is supported in the middle, above and below the hub and pivot shaft assembly with central drive shaft bearings and bearing housing 12. In both turbine designs seen in FIG. 11A and 11B the turbine's rotating lower end assemble 8 just above the ground support structure 36 has a thread collar (not shown) that can be adjusted to regulate the vertical bearing clearance between it, its bearing and thrust washer and the stationary central foil stationary end plate 24.

As seen in FIG. 11B the central foil assembly is much simpler. The end plates 24 are joined to the stationary central axle 9 as the rotating turbine assembly rotates thereabout supported on its upper and lower end assembly 8 and corresponding ring bearings 35 and thrust bearing 29. Because the wind foil is fixed, the half or any part or shape thereof that faces the glide side of the sweep area excepting end plate 24 can be removed as shown in both FIG. 11A and 11B. The remainder can be closed off with plate 37, either attached with fasteners or welded close creating a sealed chamber that with other advantages can be used for buoyancy.

The advantage of removing some portion of the foil on the glide side of the sweep area is to allow the currents to freely pass through creating as little drag resistance and turbulence as possible from the stationary foil. Foil 33 functions like the central current funnel but also becomes a foil because it not only increases captured volume generated in its capacity as a funnel, but also increases fluid velocity generated by the dissimilar curvatures of its shape.

One advantage of turbine models having the rotating central wind foil 11 as seen in FIGS. 1 and 3 is that these units are naturally self trimming. Models with stationary fixed foils 33 are not self trimming without being placed on a weather vane windmill mount as seen in FIG. 11B with self trimming tail section 44 attached to the stationary axle 9 and joined foil assembly 33 and wind mill mount 36.

Deflection Panel

In FIG. 11C there is featured an inter-stationary deflection panel attached to the inter-stationary central foil 33. When the PAVA's wings 22 retract in glide they present a minimum glide profile. Consequently there is a substantial unused area in the glide quadrants that is never entered into or infringed upon by any of the turbines moving parts. The significant amount of otherwise un-captured current passing through this area can be captured dramatically increasing the efficiency of the turbine. The deflection panel 88 harvests this current by directing it into the drive wings. The deflection panel shown here is of a flat rectangular shape, a spiraled or curved shaped panel possibly that encompasses the foil may prove to be superior.

This turbine with its inter-stationary structure, as is true of the inventor's earlier turbine, can be placed on a weather vane to become a self trimming unit that will self trim to face into the direction of the oncoming current as also see in FIG. 11C.

In FIG. 11C this self tracking embodiment consists of a tail assembly 44, an extended and strengthened main axle of a length suitable to have more than one support collar with matching thrust bearings spaced sufficiently apart on the extended axle attached to a platform or anchored into the ground in a structure that is suitable to support such a turbine.

As seen in FIG. 11D The deflection panel and the central foil are stationary and fixed at the center of the turbine around which rotates the turbine's end assembly/drive shaft and rotating wing assemblies. The tubular pivot shafts of the wing assemblies 13 pivot on stationary axle 15 that extends between the two end assemblies 8. Each opposed flap deploys out in drive to a position transverse to the current flow enveloping the whole drive side of the sweep area and then retracts to their thin aerodynamic profile in glide, passing just outside the stationary deflection panel 88. As one wing assembly 13 passes panel 88 in its glide excursion seen at the left of the figure there is an opposed wing assembly 13 on the opposite side of the sweep area, that is harvesting a significant portion of the deflected current that otherwise would pass through the glide quadrant, turning the defected current into useful torque that is transferred to the turbine assembly and harvested to do useful work.

FIG. 11E is a perspective view of the turbine in 11D showing the leeward side of the turbine with tail assembly 44, the back side of deflection panel 88 and a part of foil 33. From this view the current indicated by the arrow at the top of the figure is rotating the turbine counter clockwise. The wing assembly 13 on the right of the figure has it flaps retracted and is in it glide posture poised to pass the deflection panel that is directing the current, entering into the glide quadrants, into the flaps 22 on the left side of the figure that is in drive position 38. The rotating turbine assembly is rotating on its drive shaft bearings, not shown at this perspective around stationary axle 9 that in turn is rotatable about its axle bearing 17 held within a bearing housing within the grounding wind mill platform 36.

Tail section 44 is proportioned and poised at a position that offsets, and is equal to, the leverage angle and proportion of deflection panel 88. With the current effect on the tail section equal and on opposite sides of the central axis the wind force and leverage of each structure is neutralized so that the joined tail section 44, axle 15, foil 33 and deflection panel 88 can rotate on axle bearing 17 freely tracking into the changing direction of the incident fluid current. The inter-stationary parts 44, 33, 88, 9 and 84 are the crosshatched portion of FIG. 11E.

As a conceptual example of converting the torque generated by the rotating turbine into useable energy, this figure shows the stationary platform 36 with the rotating turbine assembly's ring gear 42 around its lower perimeter that serves as the power take of that engages with the armature gear of the generator with current transferred out cable 84.

Figure 12:
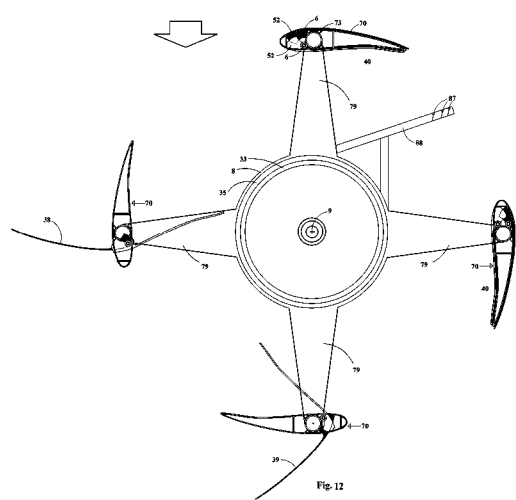
FIG. 12 is a top view of a PAVA having four teardrop shaped wing assembly 70.

FIG. 12 shows a turbine with four teardrop shaped dual winged assembly 70 in their wing cycle positions. At the left of the figure the flaps of that teardrop wing assembly 70 are in drive 38, the bottom of the wing assembly is in trans-glide 39. At the left and the top the two wing assemblies are shown with their flaps retracted in glide position 40. The wings in this model are not geared together but are regulated naturally by the fluid currents. At the extended end of deflection panel 88 are three knock out hinged sections 87. In the event of flap collision due to extreme turbulence these hinged sections are designed to be knocked out of the way by the colliding inner flap. In this design the opposed end assembly 8 are a hub style, each one having four spoke like arms 79, between each pair of opposed arms are supported a teardrop wing assembly 70. The end assembly 8 rotates on ring bearing 35 around the central foil 33 and deflection panels are joined to the axle 9 as one stationary unit. The cross at the center of axle 9 is central axis 21.

Note: this figure has a transparency showing the wing assemblies 70 below the end assembly that in reality would be blocked from view by the end assembly. At the top of FIG. 12 some of the parts of the wing assembly 70 are identified. This is a dual winged design "B" assembly 70 as seen in FIG. 10F where the weights of one flap swing over and under the larger weight of the other flap that is in between them in their retracted glide position. In this example both pivot shafts 6 are individually attached in a hinged arrangement to mounting column 73. The pivot shafts 6 of each wing assembly are visible from this prospective with the counter balancing weight 52 of the inner flap extending over the weight 52 of the outer flap. As the wing transitions into its drive wing position 38 as seen at the left of the figure, the inner flap upper weights 52 pivots over the outer flap larger weight also blocking the outer weights pivot shaft from view. Looking down on mounting column 73 we see the weights have entered into the inner space of the column. The portion of the column that corresponds to the pivot drive radius of each weight 52 has been removed to give the wing's weight 52 room to pivot into the space inside the column provided for it.

Figure 13:
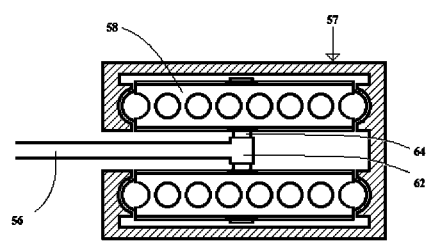
FIG. 13A is a top view of FIG. 12 with added cam system (present prototype).
FIG. 13B is a detail of the cam follower 58 of the turbine in FIG. 13.

In FIG. 13A the turbine is rotating counterclockwise with the wind bearing indicated by the arrow at the top. Only two opposing wing assemblies 70 are illustrated as the other two are identical except for their perpendicular orientation. Looking down on the wing housing assembly 70 on the left of the figure the inner flap counterbalancing weight is extended out in the flap drive opposition 38 under the outer wing's (cross-hatched) counter weight 52. The two opposed flap in this Model "B" design as seen in FIG. 10F are geared together in the middle between their respective weights 52. A portion of the inner wing's gear 63 is hidden under the outer wing's counter weight 52. The outer flap upper gear 63 is the driver gear that engages with the geared portion the bell crank 55.

The opposed flaps of each assembly 70 are actively regulated by a cam system that regulates and controls each wing throughout its complete rotational excursion. The cam system consists of a cam track 57, attached to the upper and lower stationary cylindrical foil 33, a push rod assembly consisting of a push rod 56, push rod journal 62, cam follower bearing axle 64, push rod housing bearing block 53, cam follower bearing 58, and a bell crank 55. The cam track has a semicircular portion centered around the turbines central axis that concentrically corresponds to the radius of the wings glide cycle. The eccentric portion of the cam track is in the shape of a cam lobe with the sloped portion of the lobe corresponding to the wing's transitions into and out of drive. The concentric portion of the lobe between the slopes corresponds to the wings approximate 90° of its drive cycle.

The cam followers is a common mechanism and can vary in design. The example in FIG. 13B has two sets of sealed ball bearings 58. The balls of each set of bearings roll inside an oval circular race provided for each bearing inside the interior of the cam track 57. A detail showing the push rod 56 and cam follower bearing 58 within a cross sectional view of the cam track is seen in FIG. 13B. Pushrod 56 has a bearing housing with bearing 62 at one extended end that rotates around an axle 64 that it shares with cam follower's roller bearings 58. As seen in FIG. 13A the push rod atop the end assembly 8 extends out over the hub arm 79 of the end assembly through bearing blocks 53, over the top of the teardrop housing assembly 70 where by bearing means it attaches to the lever of the bell crank 55. Bell crank 55 is a combination lever and gear that rotates on a fixed axis attached to the top of wing housing 70. The gear of the bell-crank is engaged with the wing gear 63.

When the cam follower reaches the lobe of the cam track the bell crank lever is activated and the attached opposed wings deploy into drive. When the cam follower reaches the top of the lob it holds the wings in their drive position until it reaches the downward slope of the lob to start the trans glide cycle closing the wings into their glide formation where they will stay until the turbine rotates the cam follower back around to the lobe to start the drive cycle again.

In this example the turbine stationary axle extends out the bottom of the turbine and is supported and made rotatable on axle bearings and bearing housings attached above and inside wind mill platform 36. Also attached to the joined stationary axle, wing foil 33 and deflection panel 88 is the extension arm and tail of the tail assembly 44. The addition of the tail assembly 44 of appropriate size and shape to the leeward side of the apparatus forms a traditional weather vane. Because the tail in this example is placed outside the sweep area at a greater distance from the central axis as its corresponding central deflection panel 88, it consequently can be much smaller, having greater comparative leverage.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

REFERENCE NUMERALS

Figure 2:
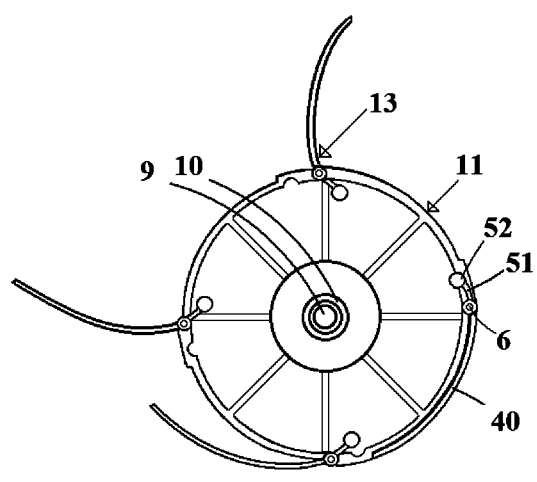
FIG. 2A is a perspective view of a single stage turbine with foil 11 deflection panel 85.
FIG. 2C is a top view showing the wing profile integrated into foil 11 or concentric ring.

Concentric ring 100 200 300
1 alternative reinforced upper and lower extended frame and drive stop FIG. 4
2 box fairing
3 drive stop (upper or lower or side)
4 glide stop (upper or lower or side)
5 side support structure (strut)
6 wing's pivot shaft
7 cylindrical turbine frame structure
8 upper and lower end assembly
9 main axle
10 central drive shaft
11 cylindrical rotating wind foil
12 central drive shaft bearing and bearing housing
13 pivoting wing assembly
14 pivot shaft assembly
15 pivot shaft's stationary axle
16 pivot shaft thrust washers and bearing in FIG. 6
17 axle bearing
18 axle bearing housing or (bearing housing)
19 cap plate
20 fastener
21 center axis
22 wings
23 90 degree wing tip, wing tip housing 68
24 end plate of stationary foil 33
25 Axle plate for central foil assembly 33
26 articulating flat belt
27 pivot shaft end gear
28 outer housing structure (stationary) turbine
29 thrust washer and bearings
30 housing roller bearing assembly
31 Twin turbine housing frame structure
32 side support for turbine housing for PAVA and hybrid
33 interstationary central wind foil.
34 Wind foil 33 fasteners
35 roller bearing assembly inter stationary wind foil 33
36 above ground support structure
37 plate for wind foil in FIG. 11
38 drive
39 trans glide
40 glide
41 trans-drive
42 Power take off PTO
43 turbine assembly without 28 (single stage PAVA)
44 tail assembly
45 upper and lower end assembly end plate
46 race for roller bearings
47 roller bearings
48, locking nut for tail assembly 44
49 upper and lower fasteners between end assembly 8 and side support 32.
50 bearing between stationary main axle 9 and turning main shaft 10, FIG. 11 part
51 wing's counter balancing weight arm,
52 wing's counterbalancing weight
53 push rod housing mound on assembly 8
54 contact pad on wing assembly 13,
55 bell crank
56 push rod for cam
57 cam track
58 cam follower bearing
59 air scoop on wing of wind fairing.
60 Wind fairing wing seal
61 Tear dropped wind foil wing housing with one wing assembly 13
62 push rod journal
63 wing gear and opposing wing gears
64 follower bearing axle
65 driver gear
67 spline and socket for counterbalancing weight in pivot shaft assembly 14.
68. housing for wing's right angle turned up mine wing
70 teardrop shaped housing two wing assembly 13 housing
71 wing flap
73 mounting column wing and housing assembly 70 and 61
78 wing/housing 61 and 70 upper or lower end assembly
79 hub arm of triangulated and quad-angulated turbine end assembly
80 pivoting wind foil shaft.
81 stationary tubular wind foil axle and bearing housing
82 male stop on wind foil axle 81
83 wing flap for air foil 70
84 generator
85 interior exterior deflection structure in stage 1 PAVA FIG. 1C
86 extension funnel attachment.
87 deflection panel hinged impact end section
88 deflection panel attached to central wind foil (PAVA)
90 reversing gear for opposed wings in airfoil housing 70
91 gear attachment axle bracket assembly 70
93 sleeve with key way in assembly 70

The invention claimed is:

1. A turbine assembly for converting fluid flow into rotational movement for useful work, including:

a central drive shaft assembly rotatable about a central axis:

a pair of end assemblies secured to said central drive shaft assembly and spaced apart along said central axis:

a plurality of primary wing assemblies secured between said end assemblies and rotatable about primary pivot axes that are parallel to said central axis:

said primary wing assemblies impinging on the fluid flow and turnin said central drive shaft assembly in a rotational drive direction;

said primary wing assemblies being reciprocally rotatable about their respective pivot from arp imary drive position in which said primary wing assemblies extend generally radially with respect to said central axis and transverse to incident fluid flow to maximally impinge on said fluid flow, to a primary glide position in which said primary wing assemblies extend generally tangentially to said rotational drive direction to minimize drag;

pivot means for securing said primary wing assemblies between said end assemblies, said pivot means permitting limited angular motion of said primary wing assemblies between said primary drive and primary glide position; and, a central airfoil secured about said central drive shaft assembly for deflecting fluid flow towards said drive position of said primary wing assemblies.

2. The turbine assembly of claim 1, wherein said pivot means includes a pivot shaft extending between said end assemblies and secured to a proximal edge portion of each of said primary wing assemblies.

3. The turbine assembly of claim 2, further including at least one counterweight secured to said primary wing assemblies and extending transverse to the pivot shaft in diametrical opposition to a respective primary wing assembly.

4. The turbine assembly of claim 1, further including a plurality of glide stops secured to said central drive shaft assembly and disposed to cushion and detain said primary wing assemblies in said glide position.

5. The turbine assembly of claim 1, further including a plurality of drive stops secured to said end assemblies and disposed to cushion and detain said primary wing assemblies in said primary drive position.

6. The turbine assembly of claim 1, wherein said central airfoil has a closed curved shape concentric about said central axis, and said primary wing assemblies each include a curved surface adapted to impinge on said closed curved shape in flush, complementary fashion when said primary wing assemblies are in said primary glide position.

7. The turbine assembly of claim 6, further including mechanical means for connecting at least a pair of said primary wing assemblies for rotational motion in concert, whereby one of said pair of primary wing assemblies rotates into said drive position when the other primary wing assembly rotates into said glide position.

8. The turbine assembly of claim 1, further including a plurality of fairing elements disposed to circumscribe at least a portion of said primary wing assemblies in said drive position and deflect incident fluid flow toward said primary wing assemblies.

9. The turbine assembly of claim 1, wherein said primary wing assemblies each include a panel having a teardrop cross-sectional configuration defining a broad leading edge and an opposed thin trailing edge.

10. The turbine assembly of claim 9, wherein said pivot means extend from said end assemblies to said broad leading edge of said panel.

11. The turbine assembly of claim 10, wherein said panel is curved about a focal axis that is parallel to said central axis.

12. A turbine assembly for converting fluid flow into rotational movement for useful work, including:

a central drive shaft assembly rotatable about a central axis:

a pair of end assemblies secured to said central drive shaft assembly and spaced apart along said central axis;

a plurality of primary wing assemblies secured between said end assemblies and rotatable about primary pivot axes that are parallel to said central axis:

said primary wing assemblies impinging on the fluid flow and turning said central drive shaft assembly in a rotational drive direction;

said primary wing assemblies being reciprocally rotatable about their respective pivot axes from a primary drive position in which said primary wing assemblies extend generally radially with respect to said central axis and transverse to incident fluid flow to maximally impinge on said fluid flow, to a primary glide position in which said primary wing assemblies extend generally tangentially to said rotational drive direction to minimize drag:

pivot means for securing said primary wing assemblies between said end assemblies, said pivot means permitting limited angular motion of said primary wing assemblies between said primary drive and primary glide positions: and, a plurality of secondary wing assemblies secured between said end assemblies and rotatable about secondary pivot axes That are parallel to said central axis;

said secondary wing assemblies being reciprocally rotatable about their respective secondary pivot axes from a secondary drive position in which said secondary wing assemblies extend generally radially with respect to said central axis and transverse to incident fluid flow to maximally impinge on said fluid flow, to a secondary glide position in which said secondary wing assemblies extend generally tangentially to said rotational drive direction to minimize drag;

each of said secondary pivot axes being disposed directly adjacent a respective one of said primary wing assemblies, whereby each primary wing assembly and a respective secondary wing assembly are disposed generally contiguously when in said primary and secondary drive positions.

13. The turbine assembly of claim 12, further including a plurality of secondary glide stops secured between said end assemblies and disposed to cushion and detain said secondary wing assemblies in said secondary glide position.

14. The turbine assembly of claim 12, further including a plurality of secondary drive stops secured to said end assemblies and disposed to cushion and detain said secondary wing assemblies in said secondary drive position.

\* \* \* \* \*